United States Patent
Takeda et al.

(10) Patent No.: US 10,359,581 B2
(45) Date of Patent: Jul. 23, 2019

(54) CLAMP MEMBER, OPTICAL CONNECTOR, AND MANUFACTURING METHOD OF OPTICAL CONNECTOR

(71) Applicant: FUJIKURA LTD., Tokyo (JP)

(72) Inventors: Daiki Takeda, Chiba (JP); Shigeo Takahashi, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 16/125,937

(22) Filed: Sep. 10, 2018

(65) Prior Publication Data

US 2019/0094473 A1  Mar. 28, 2019

(30) Foreign Application Priority Data

Sep. 25, 2017  (JP) .................... 2017-183358
Sep. 25, 2017  (JP) .................... 2017-183361

(51) Int. Cl.
*G02B 6/38* (2006.01)

(52) U.S. Cl.
CPC .......... *G02B 6/3887* (2013.01); *G02B 6/3891* (2013.01)

(58) Field of Classification Search
CPC ...................... G02B 6/3887; G02B 6/3891
See application file for complete search history.

(56) References Cited

U.S. PATENT DOCUMENTS

| | | | |
|---|---|---|---|
| 6,104,855 A | 8/2000 | Jeon | |
| 7,090,406 B2 | 8/2006 | Melton et al. | |
| 7,568,844 B2 | 8/2009 | Luther et al. | |
| 2002/0097964 A1 | 7/2002 | Roehrs et al. | |
| 2009/0305542 A1 | 12/2009 | Masuzaki | |
| 2010/0215322 A1 | 8/2010 | Matsumoto et al. | |
| 2011/0075974 A1 | 3/2011 | Katagiyama et al. | |
| 2013/0177283 A1 | 7/2013 | Theuerkorn et al. | |
| 2018/0045894 A1 | 2/2018 | Takahashi et al. | |
| 2018/0261986 A1* | 9/2018 | Kempeneers | H02G 3/083 |

FOREIGN PATENT DOCUMENTS

| | | |
|---|---|---|
| JP | H064711 U | 1/1994 |
| JP | H09203814 A | 8/1997 |
| JP | H1195064 A | 4/1999 |
| JP | 2000258655 A | 9/2000 |
| JP | 2008-052236 A | 3/2008 |
| JP | 2011-075912 A | 4/2011 |
| JP | 2013-218328 A | 10/2013 |
| JP | 2016-512902 A | 5/2016 |
| JP | 2016-164598 A | 9/2016 |
| WO | 2013/177014 A1 | 11/2013 |

OTHER PUBLICATIONS

Extended European Search Report issued in European Application No. 18192970.4; dated Feb. 21, 2019 (7 pages).
Notice of Reasons for Refusal issued in Japanese Application No. 2017-183358, dated Apr. 16, 2019 (12 pages).
Notice of Reasons for Refusal in Japanese Application No. 2017-183361, dated Apr. 16, 2019 (9 pages).

* cited by examiner

*Primary Examiner* — Ryan A Lepisto
(74) *Attorney, Agent, or Firm* — Osha Liang LLP

(57) ABSTRACT

A clamp member includes: a body part that includes a fiber insertion hole where an optical fiber is inserted and a hole for tension member where a tension member is inserted; and an anchoring screw that fixes the tension member to the body part. The clamp member is fixed to an end of an optical cable that includes the optical fiber and the tension member, and the clamp member is fixed to and housed in an outer housing of an optical connector.

17 Claims, 12 Drawing Sheets

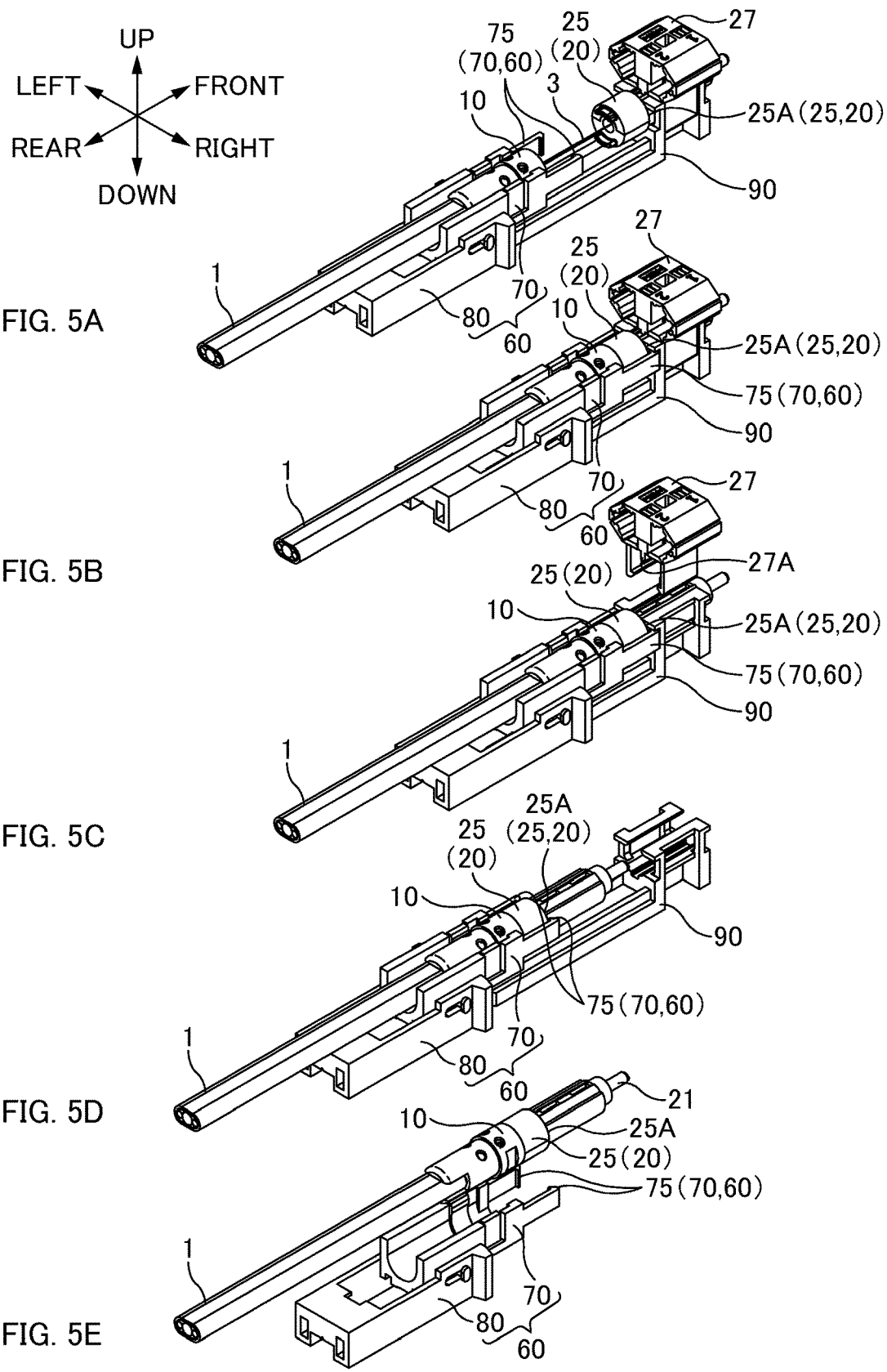

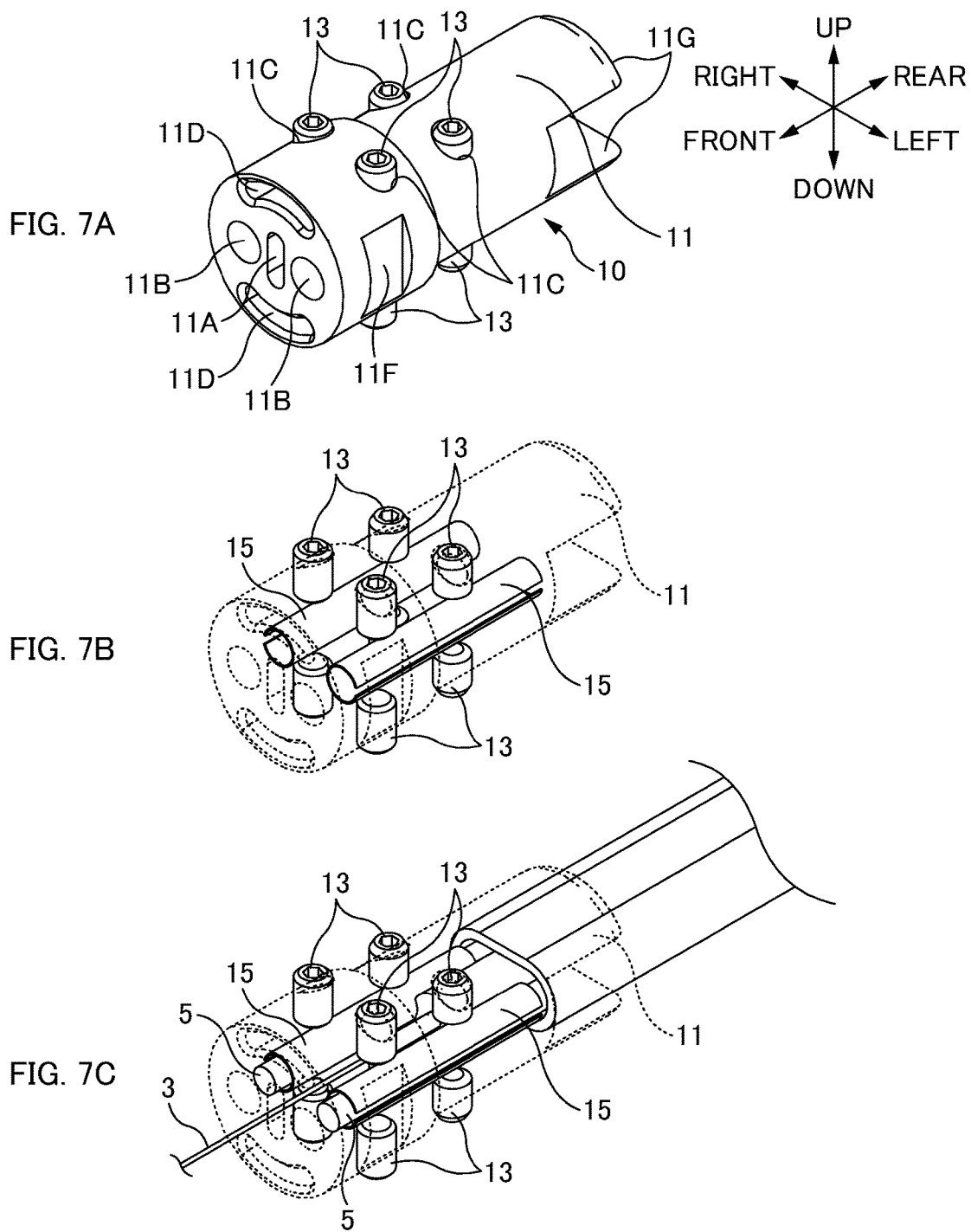

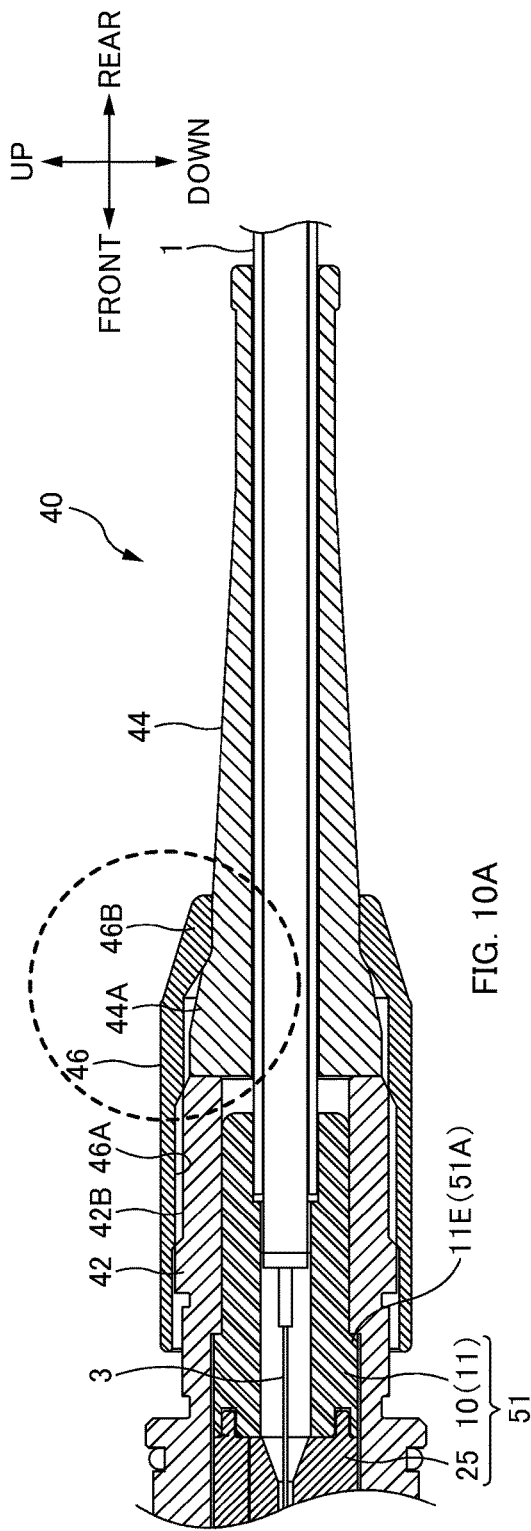
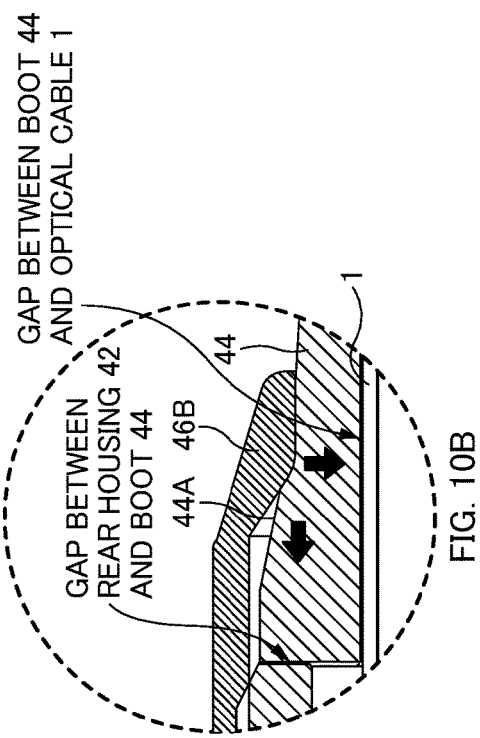
FIG. 10A
FIG. 10B

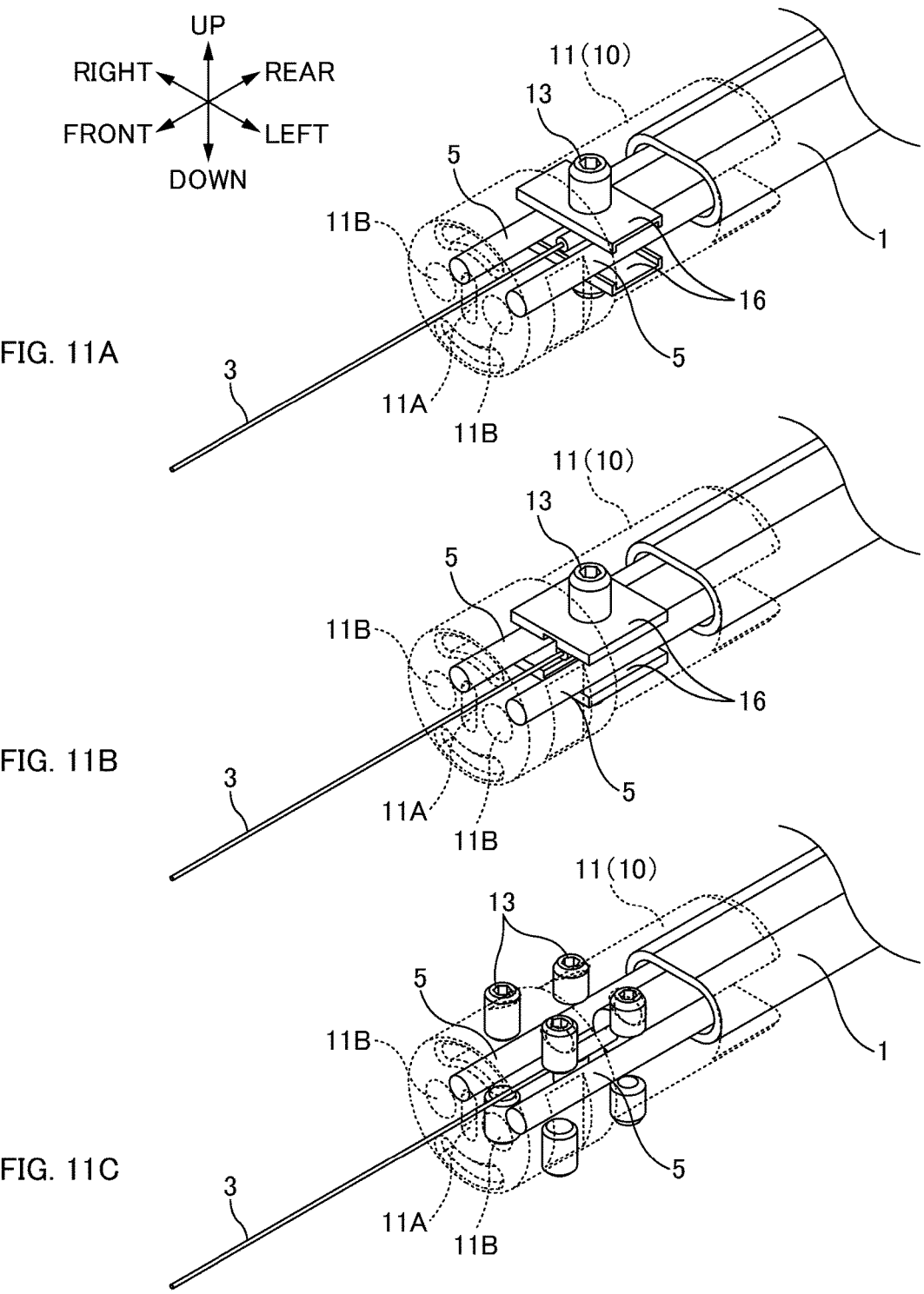

CLAMP MEMBER, OPTICAL CONNECTOR, AND MANUFACTURING METHOD OF OPTICAL CONNECTOR

CROSS-REFERENCE TO RELATED APPLICATIONS

The present application claims priority to Japanese Patent Application No. 2017-183358 filed on Sep. 25, 2017, and Japanese Patent Application No. 2017-183361 filed on Sep. 25, 2017, which are herein incorporated by reference.

TECHNICAL FIELD

The invention relates to a clamp member, an optical connector and a manufacturing method of the optical connector.

BACKGROUND

U.S. Pat. No. 7,090,406, JP 2008-52236 A, JP 2016-164598 A describe adhering a tension member of an optical cable to a predetermined part (for example, a housing) of an optical connector to fix the optical cable to the optical connector.

To fix a tension member of an optical cable to a housing of an optical connector using adhesive, equipment for curing the adhesive, such as a heater or an ultraviolet (UV) irradiation device, is required. Further, control of curing conditions of the adhesive is required to ensure stable adhesive strength. For such a reason, an easy method of fixing the tension member of the optical cable to the housing of the optical connector without using adhesive is desired.

SUMMARY

One or more embodiments easily fix the tension member of the optical cable to the housing of the optical connector.

One or more embodiments are primarily a clamp member including:
  a body part that includes a fiber insertion hole through which an optical fiber is inserted, and a hole for tension member in which a tension member is inserted; and
  an anchoring screw that fixes the tension member inserted in the hole for tension member to the body part, wherein
  the clamp member
    is fixed to an end of an optical cable that includes the optical fiber and the tension member, and
    is fixed to and housed in an outer housing of an optical connector.

Other features of one or more embodiments will be made clear by the following description with reference to the drawings.

According to one or more embodiments, the tension member of the optical cable can be easily fixed to the housing of the optical connector.

BRIEF DESCRIPTION OF THE DRAWINGS

FIGS. 4A to 4E are also explanatory views of a holder 60 that is used for preprocessing the optical fiber 3.

FIGS. 5A to 5E are explanatory views of how a connector unit 20 is attached.

FIGS. 7A to 7C are explanatory views of a clamp member 10.

FIG. 10A is a cross-sectional view of a boot unit 40. FIG. 10B is an enlarged view of a dashed line region of FIG. 10A and is an explanatory view of a state of the boot 44 after a fastening member 46 is fastened.

FIG. 11A is an explanatory view of a clamp member 10 of one or more embodiments. FIG. 11B is an explanatory view of a clamp member 10 of one or more embodiments. FIG. 11C is an explanatory view of a clamp member 10 of one or more embodiments.

DETAILED DESCRIPTION

Figure 1:
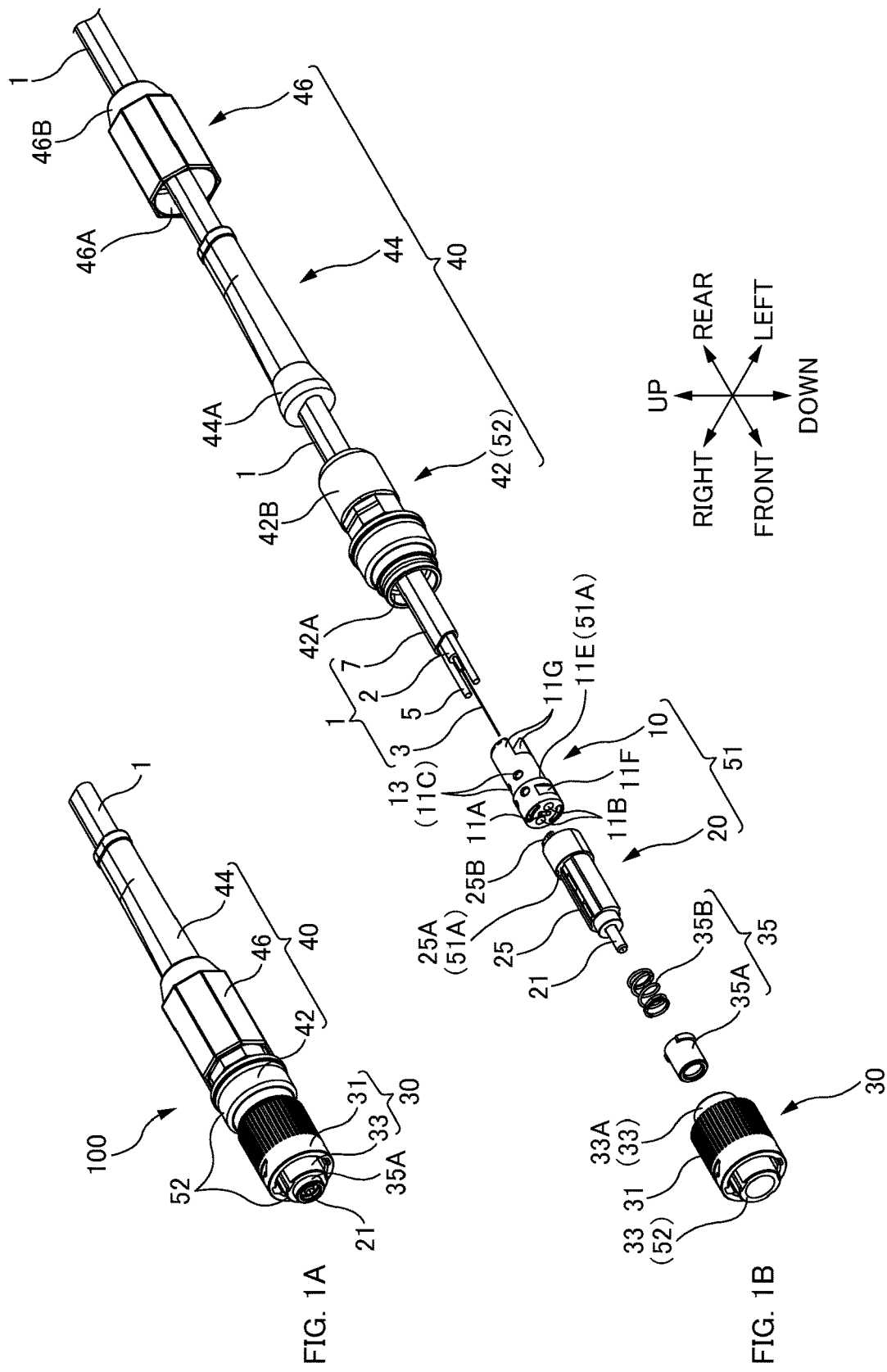
FIG. 1A is a perspective view of an optical connector 100.
FIG. 1B is an exploded view of the optical connector 100.

At least the following matters will be made clear from the following description and the drawings.

Disclosed is a clamp member including: a body part that includes a fiber insertion hole through which an optical fiber is inserted, and a hole for tension member in which a tension member is inserted; and an anchoring screw that fixes the tension member inserted in the hole for tension member to the body part, wherein the clamp member is fixed to an end of an optical cable that includes the optical fiber and the tension member, and is fixed to and housed in an outer housing of an optical connector.

In one or more embodiments: the clamp member is configured such that the anchoring screw is buried in the body part. This can realize a structure that can easily prevent lack of tightening of the anchoring screw.

In one or more embodiments: the clamp member includes a pair of anchoring screws that clamp the tension member in a direction perpendicular to a longitudinal direction of the tension member. This can realize a strong anchoring force.

In one or more embodiments: an intervening member is arranged between the tension member and the anchoring screw, and when the anchoring screw is tightened while the tension member is inserted in the hole for tension member, a screw tip of the anchoring screw presses the intervening member, and the tension member is fixed to the body part by the anchoring screw through the intervening member. This can realize a strong anchoring force since the area of pressing the tension member can be enlarged.

In one or more embodiments: a tubular sleeve as the intervening member is arranged in the hole for tension member, and when the anchoring screw is tightened while the tension member is inserted in the sleeve, the screw tip of the anchoring screw presses the sleeve, to deform the sleeve, and the tension member is fixed to the body part by the anchoring screw through the sleeve. This can realize an especially strong anchoring force, since the contact area of the internal wall of the tubular sleeve and the external surface of the tension member can be enlarged.

In one or more embodiments: before tightening the anchoring screw, a gap is formed between the screw tip of the anchoring screw and the intervening member. This can realize a structure where a stable anchoring force can be easily obtained.

In one or more embodiments: when the anchoring screw is tightened while the tension member is inserted in the hole for tension member, the screw tip of the anchoring screw presses the tension member, and the tension member is fixed to the body part. This can realize reduction of the size of the clamp member.

In one or more embodiments: the body part includes a key groove that fits a key protrusion of a holder that is used when processing the optical fiber. This can suppress positional displacement of the clamp member with respect to the holder.

In one or more embodiments: the body part includes a flange for fixing the clamp member to the outer housing. This can realize fixing of the clamp member to the outer housing by making the inner peripheral surface of the outer housing be in contact with the flange of the clamp member.

Also disclosed is an optical connector that is attached to an end of an optical cable including an optical fiber and a tension member, the optical connector including: an outer housing; a clamp member that is fixed to the tension member of the optical cable, and fixed to and housed in the outer housing, wherein the clamp member includes: a body part that includes a fiber insertion hole through which the optical fiber is inserted and a hole for tension member in which the tension member is inserted; and an anchoring screw for fixing the tension member inserted in the hole for tension member to the body part. Such an optical connector can easily fix the tension member of the optical cable to the housing of the optical connector.

In one or more embodiments: the optical connector is configured such that the anchoring screw is buried in the body part when the anchoring screw is tightened, and where a screw head of the anchoring screw protrude from the body part, the screw head of the anchoring screw contacts the internal wall of the outer housing, and the clamp member is thus prevented from being housed in the outer housing. This can prevent lack of tightening of the anchoring screw.

Also disclosed is a manufacturing method of an optical connector attached to an end of an optical cable that includes an optical fiber and a tension member, the manufacturing method of the optical connector including: (1) inserting the optical fiber through a fiber insertion hole of a clamp member, and inserting the tension member in a hole for tension member of the clamp member; (2) tightening an anchoring screw of the clamp member and fixing the tension member inserted in the hole for tension member to the clamp member; and (3) housing the clamp member in an outer housing while fixing the clamp member to the outer housing. Such a manufacturing method of an optical connector can easily fix the tension member of the optical cable to the housing of the optical connector.

Meanwhile, the above-described Patent Literature 1 to 3 describe an optical connector that is attached to an end of an optical cable. Such an optical connector is equipped with a boot that alleviates bending load on the optical cable to protect the optical cable. However, intrusion of water through a gap near the boot into the optical connector causes damages to the optical connector.

Also disclosed is an optical connector according to one or more embodiments to be attached to an end of an optical cable, the optical connector including: a boot that protects the optical cable; and a fastening member that is fastened to the outer housing while covering at least part of the boot, wherein when the fastening member is fastened to the outer housing, the fastening member presses the boot to narrow a gap between the outer housing and the boot. This can suppress intrusion of water through a gap between the outer housing and the boot.

In one or more embodiments: the boot includes a receiving part that is formed in a tapered shape, and when the fastening member is fastened to the outer housing, the fastening member presses the receiving part toward the outer housing to narrow the gap between the outer housing and the boot, and the fastening member presses the receiving part toward the optical cable to narrow a gap between the boot and the optical cable. This can suppress intrusion of water through gaps at two positions near the boot.

In one or more embodiments: the boot includes a receiving part that is formed in a flange shape, and when the fastening member is fastened to the outer housing, the fastening member presses the receiving part toward the outer housing to narrow the gap between the outer housing and the boot. This can suppress intrusion of water through a gap between the outer housing and the boot.

Further, also disclosed is an optical connector according to one or more embodiments to be attached to an end of an optical cable, the optical connector including: an outer housing; a boot that includes a cable insertion hole through which the optical cable is inserted; and a fastening member that is fastened to the outer housing while covering at least part of the boot, wherein when the fastening member is fastened to the outer housing, the fastening member presses the boot to narrow a gap between the boot and the optical cable. This can suppress intrusion of water through a gap between the boot and the optical cable.

In one or more embodiments: the boot includes a receiving part that is formed in a tapered shape, when the fastening member is fastened to the outer housing, the fastening member presses the receiving part toward the optical cable to narrow the gap between the boot and the optical cable, and the fastening member presses the receiving part toward the outer housing to narrow a gap between the outer housing and the boot. This can suppress intrusion of water through gaps at two positions near the boot.

Basic Structure of Optical Connector 100

Figure 2:
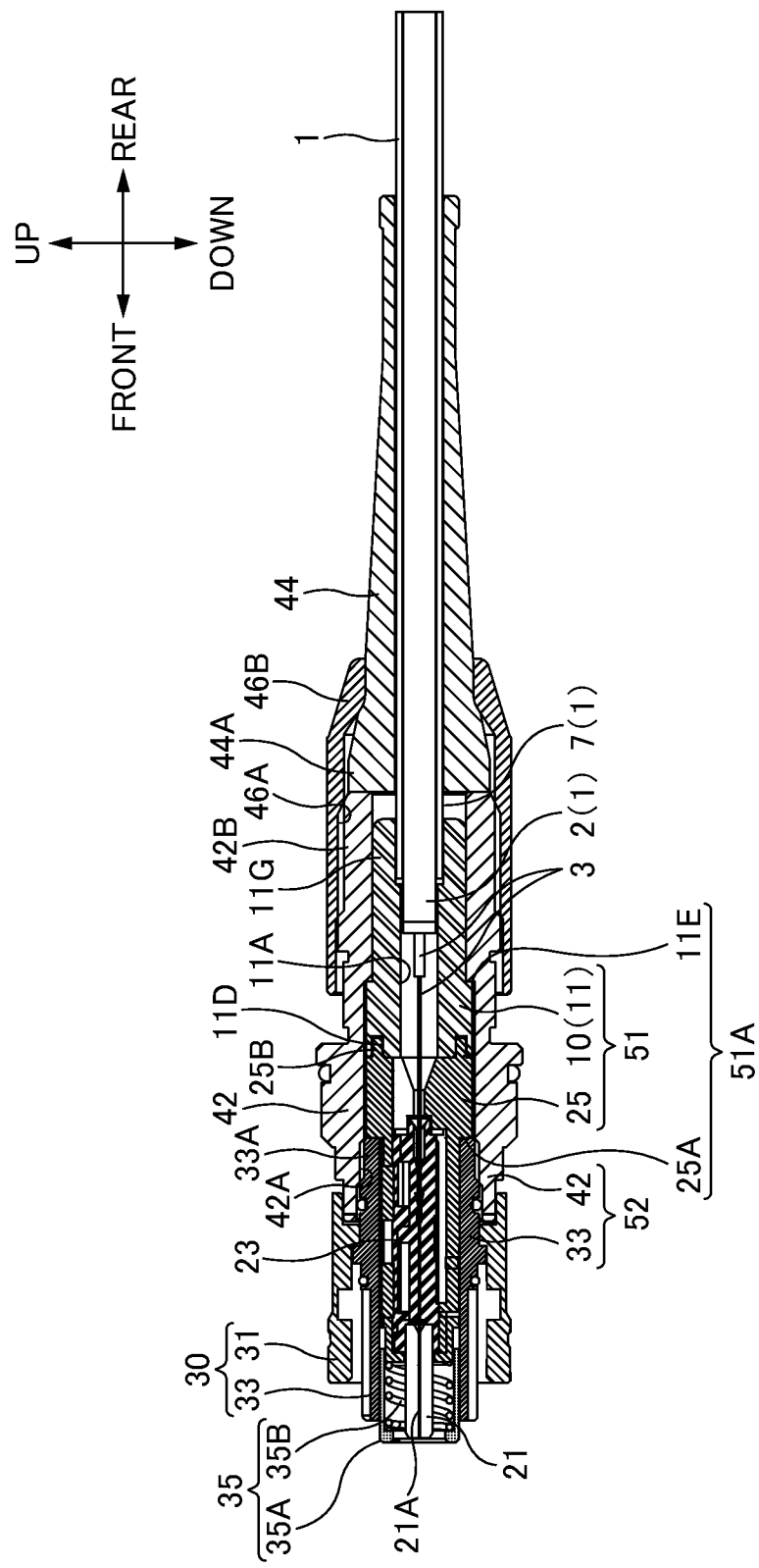
FIG. 2 is a cross-sectional view of the optical connector 100.

FIG. 1A is a perspective view of an optical connector 100.
FIG. 1B is an exploded view of the optical connector 100.
FIG. 2 is a cross-sectional view of the optical connector 100.

In the following description, directions are defined as depicted in the drawings. Specifically, an attaching/detaching direction of the connector is the "front-rear direction," where "front" is the side of the mating optical connector and "rear" is the opposite side. Note that the longitudinal direction of the optical cable 1 (or, of an optical fiber 3 or tension members 5) is the front-rear direction. Further, the major axis direction of the cross section of the flat optical cable 1 (a direction where two tension members 5 of the optical cable 1 are aligned) is the left-right direction, where "right" is the right hand side when viewed toward the front from the rear and "left" is the opposite side. Furthermore, a direction perpendicular to both front-rear direction and left-right direction is the "up-down direction."

The optical connector 100 in the drawings is a connector that is attached to an end of the optical cable 1 and can be attached to/detached from a receptacle-side optical connector (not illustrated). The optical connector 100 of one or more embodiments is a connector that is attached to an end of the optical cable 1 that is processed on the site, thus, it is referred to as a field assembly type optical connector or a field attaching optical connector. When the optical connector 100 is connected to the receptacle-side optical connector (not illustrated), the endfaces of the ferrules 21 abut on each other. As such, the endfaces of the optical fibers 3 physically abut on each other, making the optical fibers 3 be optically connected with each other. The optical cable 1 extends from the rear side of the optical connector 100. The rear side of the optical connector 100 is attached with a boot 44 for protecting the optical cable 1. The optical cable 1 attached with the optical connector 100 serves as an optical cable with optical connector.

The optical cable 1 includes an optical fiber 3 and two tension members 5 (refer to FIG. 1A). In this example, the optical fiber 3 is housed in a tube cable 2 where the tube is filled with gel. Although the tube cable 2 houses one optical fiber 3, the tube cable 2 may house a plurality of optical fibers 3. Alternatively, the optical fiber 3 may be directly housed in an outer sheath 7 of the optical cable 1 instead of being housed in a tube. The two tension members 5 are arranged to sandwich the optical fiber 3 (tube cable 2). As such, the optical cable 1 that is configured by covering, with the outer sheath 7, the optical fiber 3 (tube cable 2) and two tension members 5 has a flat cross section. Note that, in the optical cable 1, other members than the optical fiber 3 and tension members 5 (i.e., a rip cord or a water-absorbing yarn) may also be housed in the outer sheath 7.

The optical connector 100 includes a clamp member 10, a connector unit 20, a coupling unit 30, an imparting mechanism 35, and a boot unit 40.

The clamp member 10 is a housing that is attached to an end of the optical cable 1. As the clamp member 10 is a housing that is fixed to an end of the optical cable 1, the clamp member 10 may also be referred to as a fixing housing. The clamp member 10 includes a fiber insertion hole 11A and a pair of holes for tension member 11B. The clamp member 10 is fixed to an end of the optical cable 1 by being fixed to the tension members 5 that are led out of the optical cable 1. In one or more embodiments, the clamp member 10 can be fixed to the tension members 5 by tightening the anchoring screws 13 of the clamp member 10. The detailed configuration of the clamp member 10 will be described later.

The connector unit 20 includes a ferrule 21, a mechanical splice part 23, and a connector unit housing 25. The ferrule 21, in this example, is a cylindrically-shaped ferrule that is used for a single core optical connector. The front end of an internal fiber is fixed in advance to the ferrule 21, and the endface of the internal fiber is polished together with the ferrule 21. The rear end of the internal fiber is arranged in the alignment groove of a mechanical splice part 23. The mechanical splice part 23 is a member that aligns the axes (alignment) of the internal fiber and the optical fiber 3 that is led out of the optical cable 1 by a mechanical splice method, as well as, fixes the internal fiber and the optical fiber 3 while maintaining them abutting on each other. The optical fiber 3 that is led out of the optical cable 1 is inserted into the mechanical splice part 23 from the rear side of the connector unit 20 and abuts on the internal fiber. When an insertion member 27 (refer to FIGS. 5A to 5C) that has been attached to the connector unit 20 is removed in a state where the endfaces of the optical fibers 3 abut on each other, the optical fibers 3 are fixed by the mechanical splice part 23. The connector unit housing 25 is a housing for housing a portion (a flange portion) of the ferrule 21 and the mechanical splice part 23. In one or more embodiments, since the internal fiber and the optical fiber 3 can be connected by a mechanical spice method, the optical connector can be assembled with an easy assembly operation at an assembly field.

The coupling unit 30 is a member to be coupled with a receptacle-side housing (not illustrated). The coupling unit 30 includes a rotating member 31 and a front housing 33 and is configured as a bayonet type coupling mechanism. The rotating member 31 is a tubular member that is rotatable with respect to the front housing 33, and includes an engagement part to be engaged with (hook) a coupling part of the receptacle-side housing (not illustrated). The front housing 33 is a housing for housing the connector unit 20 and the imparting mechanism 35. The front part of the front housing 33 functions as an insertion part to be inserted inside the tubular receptacle-side housing (not illustrated). The rear part of the front housing 33 includes a male screw part 33A (the screw head is not illustrated in the drawings) formed on the outer peripheral surface thereof. This male screw part 33A engages with a female screw part 42A of a rear housing 42 of the boot unit 40.

The imparting mechanism 35 is a mechanism of applying a force on the optical connector 100 (the plug-side optical connector) toward the rear side upon connection of the optical connectors. The imparting mechanism 35 includes a movable housing 35A and a spring 35B. The movable housing 35A is a housing that houses the front part of the connector unit 20 (the ferrule 21) and the spring 35B and is movable in a front-rear direction with respect to the ferrule 21. The movable housing 35A is formed in a tubular shape and the endface of the ferrule 21 is exposed from the front side opening. The movable housing 35A includes a flange. When this flange is in contact with a protrusion portion formed on an inner peripheral surface of the front housing 33, the movable housing 35A is prevented from falling from the front, as well as, upon connection of the connectors, the movable housing 35A is allowed to move backward with respect to the front housing 33. The spring 35B is an elastic member that applies a backward force to the optical connector 100 (the plug-side optical connector) upon connection of the connectors. The spring 35B has a center hollow through which the ferrule 21 is inserted. The spring 35B is arranged in a contracted state between the movable housing 35A and the connector unit 20 and generates a repulsive force therebetween. The repulsive force of the spring 35B makes the coupling (engagement) between the rotating member of the coupling unit 30 and the coupling portion of the receptacle-side housing (not illustrated) rigid, making the optical connector 100 hard to come out.

The boot unit 40 is a protective member that protects the rear part of the optical connector 100 and the optical cable 1. The boot unit 40 includes a rear housing 42, a boot 44, and a fastening member 46. The rear housing 42 is a housing for housing the clamp member 10. The front part of the rear housing 42 includes a female screw part 42A (the screw head is not illustrated in the drawings) formed on the inner peripheral surface thereof. This female screw part 42A engages with the male screw part 33A of the front housing 33 of the coupling unit 30. The boot 44 is a member protecting the optical cable 1. The boot 44 includes a cable insertion hole through which the optical cable 1 is inserted. The fastening member 46 is a tubular (nut-shaped) member for fixing the boot 44 to the rear housing 42. The rear part of the rear housing 42 includes a male screw part 42B (the screw head is not illustrated in the drawings) formed on the outer peripheral surface of the rear part and the front part of the fastening member 46 includes a female screw part 46A (the screw head is not illustrated in the drawings) formed on the inner peripheral surface of the front part. The rear part of the rear housing 42 and the front part of the fastening member 46 are engaged with each other. In one or more embodiments, screwing the fastening member 46 to the rear housing 42 narrows a gap between the rear housing 42 and the boot 44, as well as, narrows a gap between the boot 44 and the optical cable 1, thereby preventing intrusion of water through the gaps. The detailed configuration of the boot unit 40 will be described later.

The clamp member 10 and the connector unit housing 25 constitute an inner housing 51. The clamp member 10 includes, at the front part, a rear flange 11E (step portion) that protrudes outward and the connector unit housing 25 includes, at the rear part, a front flange 25A that protrudes outward. The rear flange 11E and the front flange 25A form a flange 51A that protrudes outward at the center of the inner housing.

Further, the front housing 33 and the rear housing 42 constitute an outer housing 52. The outer housing 52 is a housing that houses the inner housing 51 (the clamp member 10 and the connector unit housing 25). The rear endface of the front housing 33 serves as a contact portion to be in contact with the step surface of the front flange 25A (step portion) of the connector unit housing 25. The rear housing 42 includes, on the inner peripheral surface, a contact portion (step portion) that protrudes inward and to be in contact with the rear flange 11E of the clamp member 10. When the front housing 33 and the rear housing 42 are engaged (screwed) with each other, the flange 51A (the rear flange 11E of the clamp member 10 and the front flange 25A of the connector unit housing 25) of the inner housing 51 is caught between the front housing 33 and the rear housing 42 in the front-rear direction, thereby fixing the inner housing 51 (the clamp member 10 and the connector unit housing 25) inside the outer housing 52.

Assembly Method of Optical Connector 100

The following will describe the assembly method of the optical connector 100.

Figure 3A:
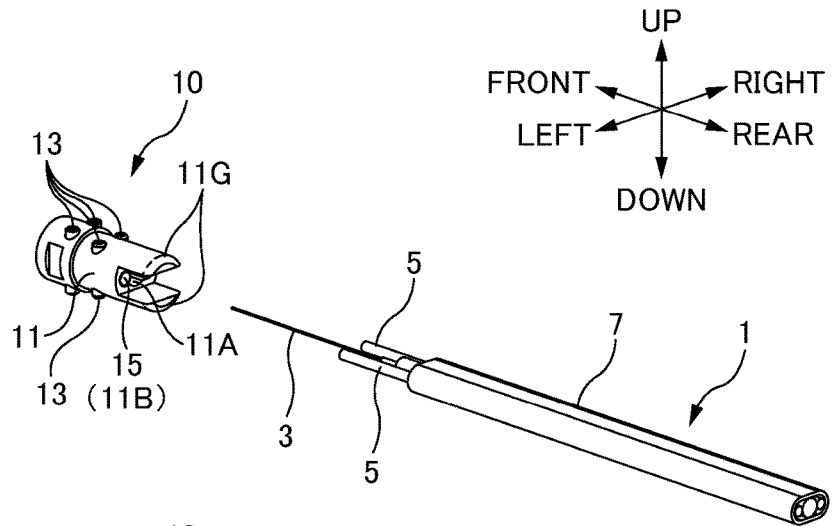
FIGS. 3A to 3C are explanatory views of how a clamp member 10 is attached to an end of an optical cable 1.
Figure 3B:
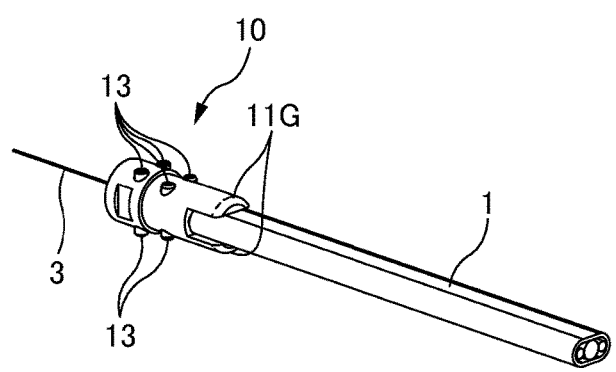
Figure 3C:
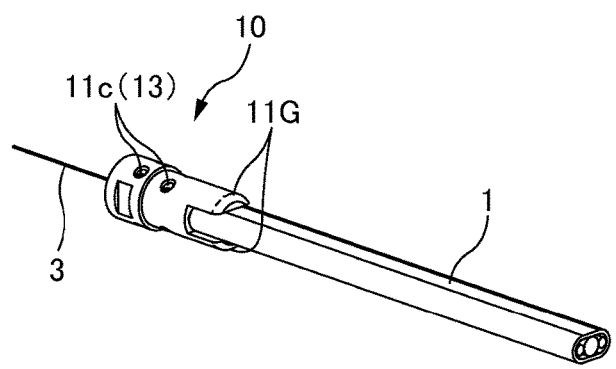

FIGS. 3A to 3C are explanatory views of how the clamp member 10 is attached to an end of the optical cable 1. After inserting the boot unit 40 (refer to FIG. 6) into the optical cable 1 in advance, a worker preprocesses (performs lead out processing on) an end of the optical cable 1 so that the optical fiber 3 and the tension members 5 protrude forward from the end (a lead out part) of the outer sheath 7 of the optical cable 1, as illustrated in FIG. 3A. As illustrated in FIGS. 3A and 3B, the worker inserts the optical fiber 3, which is led out from the optical cable 1, through the fiber insertion hole 11A of the clamp member 10, as well as, inserts the tension members 5, which are the led out from the optical cable 1, into the holes for tension member 11B of the clamp member 10. Here, the optical fiber 3 passes through the fiber insertion hole 11A and protrudes forward from the clamp member 10. On the other hand, the front end of the tension members 5 are arranged inside the holes for tension member 11B without passing through the holes for tension member 11B.

After inserting the tension members 5 into the holes for tension member 11B of the clamp member 10 as illustrated in FIG. 3B, the worker tightens the anchoring screws 13 to fix the tension members 5 to the clamp member 10, as illustrated in FIG. 3C. In this way, in one or more embodiments, the tension members 5 and the clamp member 10 can be fixed without using adhesive. Note that the detailed structure of the clamp member 10 will be described later.

As illustrated in FIG. 3A, before the tension members 5 are inserted into the clamp member 10, the screw heads of the anchoring screws 13 protrude from the external surface of the clamp member 10 (the body part 11). When fixing the tension members 5 to the clamp member 10, the worker tightens the anchoring screws 13 until the screw heads of the anchoring screws 13 are hidden from the external surface of the clamp member 10. If the screw heads of the anchoring screws 13 protrude from the external surface of the clamp member 10, the screw heads of the anchoring screws 13 contact the internal wall of the outer housing (specifically, the rear housing 42 of the boot unit 40), which prevents the clamp member 10 from being housed in the outer housing 52. In this way, lack of tightening of the anchoring screws 13 can be prevented and the tension members 5 can be fixed by the anchoring screws 13 with a predetermined tightening force.

FIGS. 4A to 4E are explanatory views of how the optical fiber 3 is preprocessed. FIGS. 4A to 4E are also explanatory views of a holder 60 that is used for preprocessing the optical fiber 3.

Figure 4A:
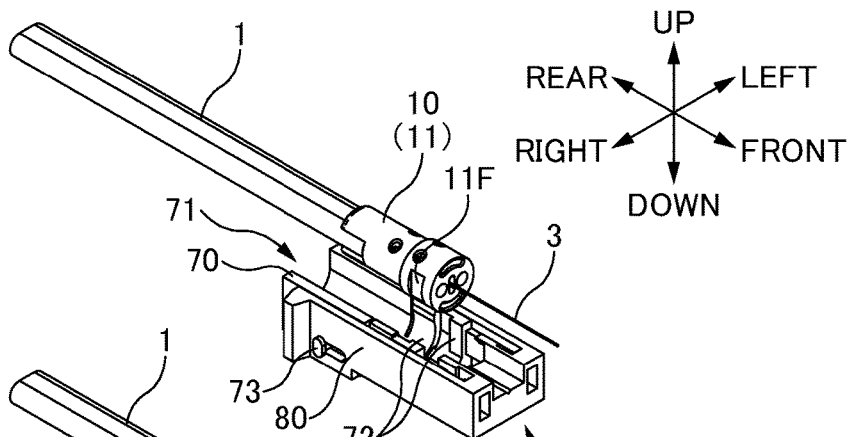
FIGS. 4A to 4E are explanatory views of how an optical fiber 3 is preprocessed.
Figure 4B:
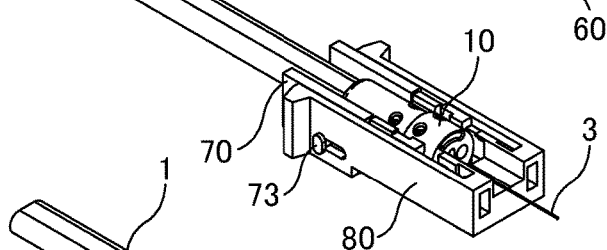
Figure 4C:
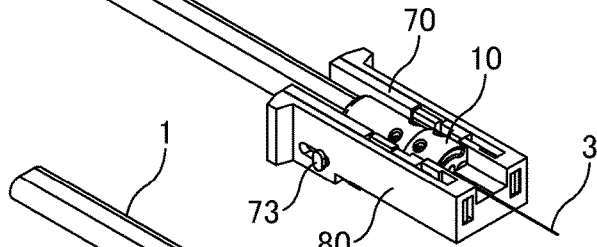
Figure 4D:
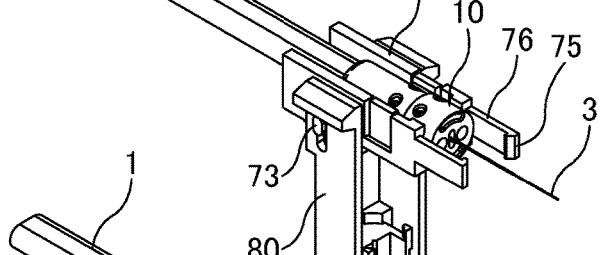
Figure 4E:
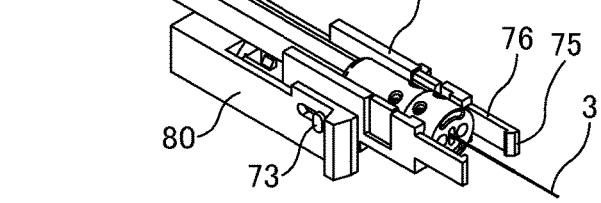

As illustrated in FIGS. 4A and 4B, the worker mounts the clamp member 10 fitted with the optical cable 1 on a holding member 70 of the holder 60. After mounting the clamp member 10 on the holding member 70 of the holder 60 as illustrated in FIG. 4B, the worker moves the holding member 70 forward with respect to a spacer member 80 (or, moves the spacer member 80 backward with respect to the holding member 70) to make the front endface of the clamp member 10 abut on the spacer member 80, as illustrated in FIG. 4C. In a state illustrated in FIG. 4C, the worker removes the coating of the end of the optical fiber 3 using a stripper (not illustrated), as well as, cuts the end of the optical fiber 3 using a cutter (not illustrated). At this time, the holder 60 (specifically, the spacer member 80) functions as a spacer, and thus the end of the optical fiber 3 is preprocessed so that a predetermined length of the optical fiber 3 extends forward from the clamp member 10. After preprocessing the end of the optical fiber 3, the worker can move the spacer member 80 out of the front part of the clamp member 10 by rotating the spacer member 80 with respect to the holding member 70, as illustrated in FIGS. 4D and 4E. Note that the detailed configuration of the holder 60 will be described later.

FIGS. 5A to 5E are explanatory views of how the connector unit 20 is attached.

As illustrated in FIG. 5A, the connector unit 20 fitted with an insertion member 27 is retained in a slider 90 in advance. As illustrated in FIG. 5A, the worker sets the holder 60 retaining the clamp member 10 in the slider 90, moves the holder 60 along the slider 90 toward the connector unit 20, and inserts the optical fiber 3 into the connector unit 20 (specifically, the mechanical splice part 23). As illustrated in FIG. 5A, the holder 60 (specifically, the holding member 70) is equipped with claw parts 75, and the worker moves the holder 60 toward the connector unit 20 along the slider 90 until the claw parts 75 of the holder 60 hook the front flange 25A of the connector unit 20. By causing the worker to move the holder 60 until the claw parts 75 hook the front flange 25A of the connector unit 20, the worker can be encouraged to insert a predetermined length of the optical fiber 3 into the connector unit 20 (specifically, the mechanical splice part 23), thereby ensuring the optical fiber 3 to abut on the endface of the internal fiber (not illustrated) of the connector unit 20. Further, the claw parts 75 of the holder 60 hook the front flange 25A of the connector unit 20, and thus the endfaces of the optical fibers 3 can be kept abutted on each other. After hooking the claw parts 75 of the holder 60 on the front flange 25A of the connector unit 20 as illustrated in FIG. 5B, the worker removes the insertion member 27 from the connector unit 20 as illustrated in FIG. 5C, removes a wedge 27A from the mechanical splice part 23, and fixes the optical fiber 3 with the mechanical splice part 23. As illustrated in FIG. 5D, the connector unit 20 can be removed from the slider 90 when the insertion member 27 is removed. After removing the connector unit 20 from the slider 90, as illustrated in FIG. 5E, the worker takes out the clamp member 10 and the connector unit 20 from the holder 60.

Note that, as illustrated in FIG. 5A, the rear end of the connector unit housing 25 of the connector unit 20 includes a pair of protrusions 25B formed thereon. Further, the front end of the clamp member 10 includes a pair of engagement holes 11D. The protrusions 25B are formed slightly larger with respect to the engagement holes 11D. When the holder 60 is moved until the claw parts 75 hook the front flange 25A of the connector unit 20 as illustrated in FIG. 5B, the protrusions 25B are pressed into the engagement holes 11D, and thus, the protrusions 25B fit into the engagement holes 11D as interference fit. As the protrusions 25B fit into the engagement holes 11D as interference fit, the connector unit 20 is in a state of being fixed to the clamp member 10 even after the clamp member 10 and the connector unit 20 are taken out from the holder 60 (refer to FIG. 5E).

Figure 6:
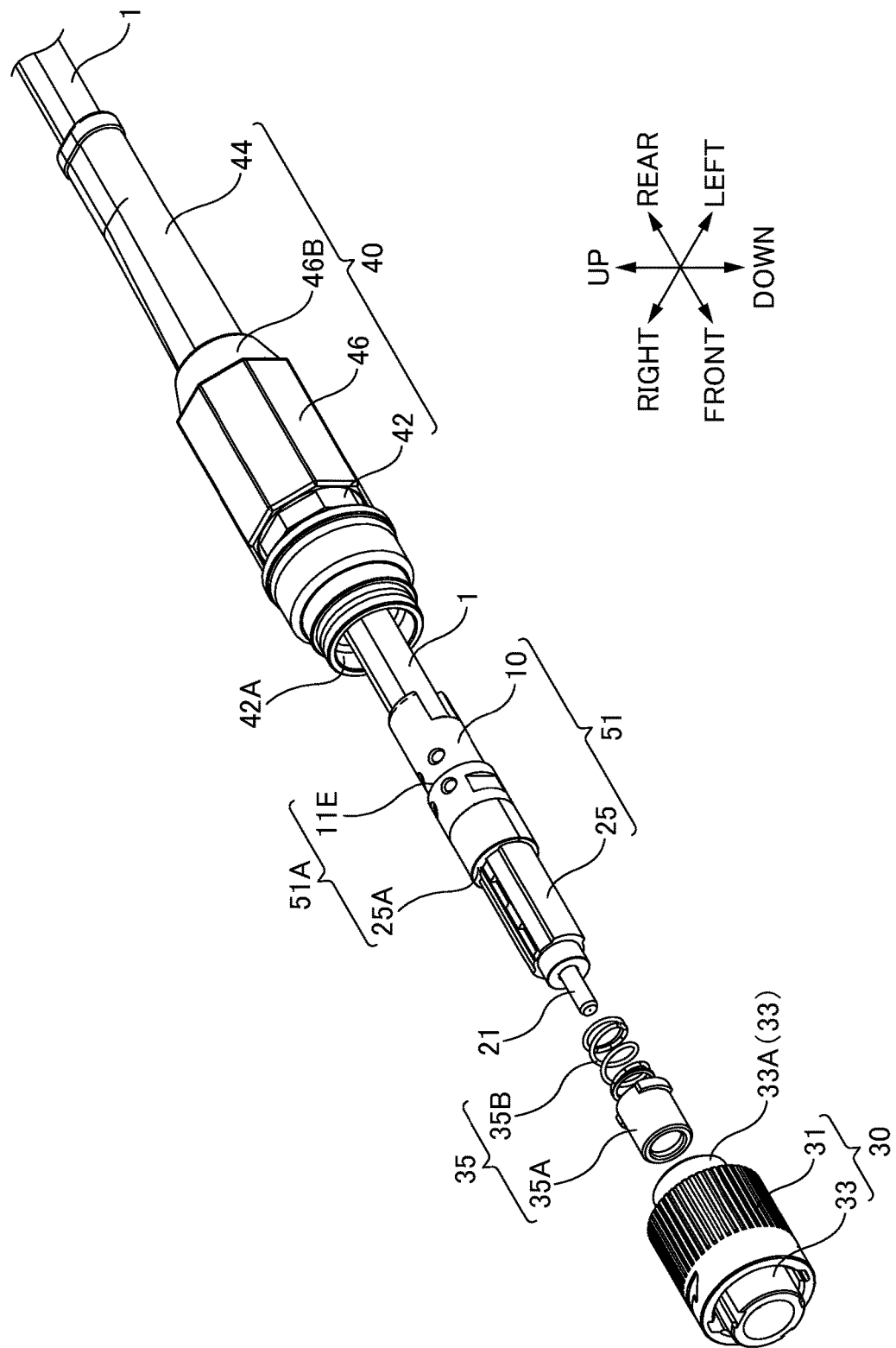
FIG. 6 is an explanatory view of how the optical connector 100 is assembled.

FIG. 6 is an explanatory view of how the optical connector 100 is assembled. Note that, FIG. 6 illustrates how the inner housing 51 (the clamp member 10 and the connector unit housing 25) is housed in the outer housing 52 (the front housing 33 and the rear housing 42).

The worker arranges the imparting mechanism 35 on the front side of the connector unit 20, fastens the front housing 33 of the coupling unit 30 and the rear housing 42 of the boot unit 40 by screwing, and houses the inner housing 51 (the clamp member 10 and the connector unit housing 25) in the outer housing 52 (the front housing 33 and the rear housing 42). When the front housing 33 and the rear housing 42 are fitted, the flange 51A of the inner housing 51 (the rear flange 11E of the clamp member 10 and the front flange 25A of the connector unit housing 25) is caught between the front housing 33 and the rear housing 42 in the front-rear direction, whereby the inner housing 51 (the clamp member 10 and the connector unit housing 25) is fixed inside the outer housing 52. Further, after attaching the coupling unit 30, the worker screws (fastens) the fastening member 46 to the rear housing 42 to make it waterproof. Note that the detailed configuration of the boot unit 40 will be described later.

In one or more embodiments, in a state where the screw heads of the anchoring screws 13 protrude from the body part 11 (refer to FIG. 3B), upon housing the inner housing 51 in the outer housing 52, the screw heads of the anchoring screws 13 contact the internal wall of the outer housing 52, preventing the inner housing 51 from being housed in the outer housing 52 (the clamp member 10 is prevented from being housed in the outer housing 52). In this way, lack of tightening of the anchoring screws 13 can be prevented and the tension members 5 can be fixed by the anchoring screws 13 with a predetermined tightening force.

The optical connector 100 of one or more embodiments is assembled (manufactured) by the above-described assembly procedure. According to the manufacturing method of the optical connector 100 of one or more embodiments, the tension members 5 and the clamp member 10 can be fixed without using adhesive. Note that it is particularly convenient that the tension members 5 and the clamp member 10 can be fixed without using adhesive when the optical connector 100 is a field assembly type optical connector as in one or more embodiments.

Clamp Member 10

Figure 8A:
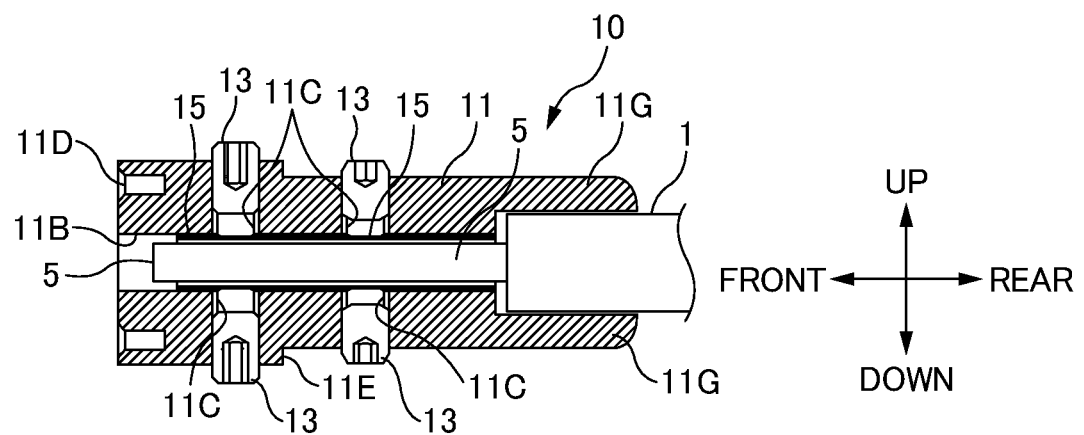
FIG. 8A is a cross-sectional view of the clamp member 10 in a state before fastening anchoring screws 13.
Figure 8B:
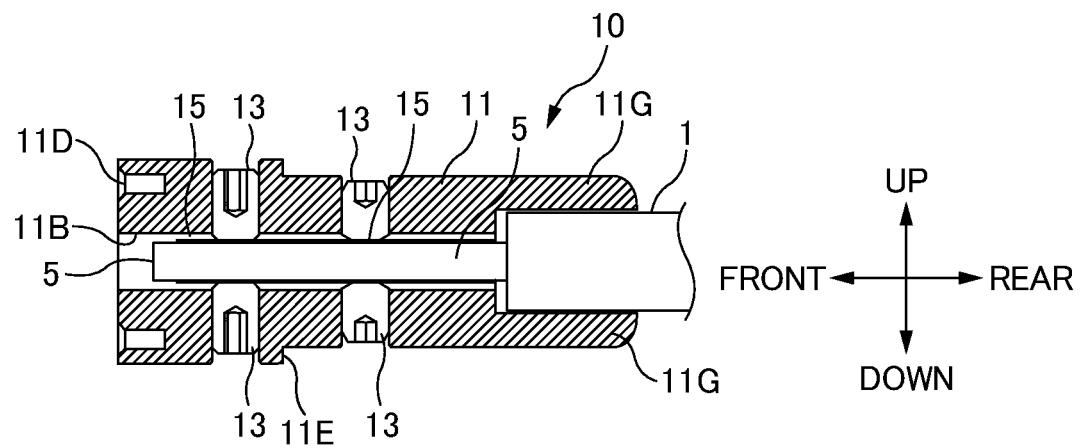
FIG. 8B is a cross-sectional view of the clamp member 10 in a state after fastening the anchoring screws 13.

FIGS. 7A to 7C are explanatory views of the clamp member 10. FIG. 7A is a perspective view of the clamp member 10. FIG. 7B is a transparent perspective view making the body part 11 of the clamp member 10 transparent. FIG. 7C is a transparent perspective view of a state where the tension members 5 of the optical cable 1 are inserted in the holes for tension member 11B of the clamp member 10. FIG. 8A is a cross-sectional view of the clamp member 10 in a state before fastening the anchoring screws 13. FIG. 8B is a cross-sectional view of the clamp member 10 in a state after fastening the anchoring screws 13.

The clamp member 10 includes the body part 11 and the anchoring screws 13. Further, the clamp member 10 of one or more embodiments also includes metal sleeves 15 as intervening members.

The body part 11 is a member that configures a body of the clamp member 10. The body part 11 includes the fiber insertion hole 11A, the pair of holes for tension member 11B, screw holes 11C, the engagement holes 11D, the rear flange 11E, key grooves 11F, and protrusions 11G.

The fiber insertion hole 11A is a through hole through which the optical fiber 3 led out of the optical cable 1 is inserted. Since the optical fiber 3 bends when the optical fiber 3 abuts on the internal fiber by a mechanical splice method, the cross section shape of the fiber insertion hole 11A has an elongated shape in an up-down direction.

The holes for tension member 11B are holes for accommodating the tension members 5 that are led out of the optical cable 1. Although the holes for tension member 11B are through holes in this example, the holes may be non-through holes of which front sides are closed as long as the tension members 5 can be inserted from the rear side. The pair of holes for tension member 11B are arranged so as to sandwich the fiber insertion hole 11A in a left-right direction. In one or more embodiments, the metal sleeves 15 are arranged inside the holes for tension member 11B (refer to FIG. 7B).

The screw holes 11C are screw holes 11C that form female screws for the anchoring screws 13. The screw holes 11C are formed along the up-down direction, and are formed to penetrate through to the outside of the body part 11. When viewed from the left-right direction, a pair of screw holes 11C are arranged vertically symmetrically with a hole for tension member 11B in between. Further, when viewed from the left-right direction, two pairs of vertically symmetrically arranged screw holes 11C are aligned in the front-rear direction. That is, two of the screw holes 11C are aligned in the front-rear direction above each hole for tension member 11B, two of the screw holes 11C are aligned in the front-rear direction below the hole for tension member 11B, and the upper-side screw holes 11C and the lower-side screw holes 11C are oppositely arranged across the hole for tension member 11B. As such, in one or more embodiments, a total of eight screw holes 11C are formed in the body part 11. Each screw hole 11C accommodates an anchoring screw 13.

The anchoring screws 13 are screws for anchoring the tension members 5 to the clamp member 10 (the body part 11). When the anchoring screws 13 are tightened, the tension members 5 are fastened by the anchoring screws 13, and the optical cable 1 is anchored to the clamp member 10 (the body part 11) through the tension members 5. The anchoring screws 13 have a function as an anchor for anchoring the tension members 5. The fastening force of the anchoring screws 13 on the tension members 5 is larger than the tightening force (torque) of the anchoring screws 13, and thus a large anchoring force can be obtained in one or more embodiments. Note that, since the clamp member 10 (the inner housing 51) is required to have a dimension that can be housed in the outer housing 52, it is especially important that the clamp member 10 of one or more embodiments can exert a large anchoring force despite the small size.

In one or more embodiments, each of the anchoring screws 13 is formed shorter than the length (depth) of the screw hole 11C, and the screw head of the anchoring screw 13 is the same width as the thread portion. Specifically, the anchoring screws 13 are set screws/locking screws. As such, the screw heads of the anchoring screws 13 can be buried in the screw holes 11C, and the anchoring screws 13 can be tightened until the screw heads of the anchoring screws 13 are hidden from the external surface of the clamp member 10 (body part 11) (refer to FIG. 3C). In other words, in one or more embodiments, the body part 11 includes screw holes 11C that can bury the anchoring screws 13. Note that the anchoring screws 13 are not limited to set screws, and even if the screw head of the anchoring screw 13 is wider than the thread portion, the screw holes 11C that can bury the anchoring screws 13 in the body part 11 can be configured by enlarging the opening of the screw holes 11C. Although the screw head (the head part) of each anchoring screw 13 includes a hexagon socket in one or more embodiments, a plus ditch or a minus ditch may be formed instead of the hexagon socket.

When viewed from the left-right direction, a pair of anchoring screws 13 are arranged to sandwich a hole for tension member 11B (a metal sleeve 15 in one or more embodiments) in the up-down direction (refer to FIGS. 8A and 8B). In this way, the pair of anchoring screws 13 can clamp the tension member 5 from both sides in the up-down direction, which can realize a strong anchoring force. Note that, if the tension member 5 is fastened by the anchoring screws 13 only from one side in the up-down direction, the tension member 5 cannot be clamped with a uniform force, whereby the tension member 5 is bent and the anchoring force is weakened.

Further, when viewed from the left-right direction, two pairs of vertically arranged anchoring screws 13 are arranged in the front-rear direction (refer to FIGS. 8A and 8B). Specifically, two of the anchoring screws 13 are arranged in the front-rear direction above each hole for tension member 11B, two of the anchoring screws 13 are arranged in the front-rear direction below the hole for tension member 11B, and the upper-side anchoring screws 13 and lower-side anchoring screws 13 are oppositely arranged across the hole for tension member 11B. In this way, a strong anchoring force can be realized by arranging a plurality of anchoring screws 13 in the front-rear direction.

The engagement holes 11D are holes into which the protrusions 25B (refer to FIG. 5A) at the rear end of the connector unit housing 25 fit. The engagement holes 11D are formed in the front end (the front endface) of the clamp member 10. The engagement holes 11D are formed slightly smaller than the protrusions 25B so that the protrusions 25B fit into the engagement holes 11D like interference fit. When the protrusions 25B fit into the engagement holes 11D like interference fit, the connector unit 20 can be fixed to the clamp member 10 even before housing the inner housing 51 in the outer housing 52 (refer to FIG. 5E).

The rear flange 11E is a portion (a step portion) that protrudes outward at the front part of the clamp member 10. The rear flange 11E, together with the front flange 25A of the connector unit housing 25, constitutes the flange 51A that protrudes outward at the center part of the inner housing 51. When the inner housing 51 is housed in the outer housing 52, the rear flange 11E is in contact with a contact portion (a step portion) that protrudes inward from the inner peripheral surface of the rear housing 42 (refer to FIG. 2).

The key grooves 11F are groove-shaped portions formed in the outer peripheral surface of the clamp member 10. The key grooves 11F are configured to fit key protrusions 72 of the holder 60 and restrict the posture of the clamp member 10 when the clamp member 10 is housed in the holder 60. The key grooves 11F are formed in a groove shape along the up-down direction and restrict rotational displacement of the clamp member 10 with respect to the holder 60 and positional displacement of the clamp member 10 in front-rear and left-right directions with respect to the holder 60.

The protrusions 11G are portions that are formed to protrude backward from the rear end of the clamp member 10. The upper and lower parts of the rear end of the clamp member 10 each includes a protrusion 11G formed thereon to protrude backward. The upper and lower pair of protrusions 11G grip the outer sheath 7 of the flat optical cable 1 in the up-down direction (in the minor axis direction of the optical cable 1). In this way, even before the anchoring screws 13 are tightened (refer to FIG. 3B), positional displacement (especially, positional displacement in the rotation direction) of the clamp member 10 with respect to the optical cable 1 can be prevented.

Intervening members are members that intervene between the tension members 5 and the anchoring screws 13. In one or more embodiments, tubular metal sleeves 15 are used as the intervening members. By arranging the intervening members (the metal sleeves 15) between the tension members 5 and the anchoring screws 13 as in one or more embodiments, compared with a case where the screw tips of the anchoring screws 13 are directly in contact with the tension members 5, the area of pressing the tension members 5 can be enlarged, which can realize a strong anchoring force.

Meanwhile, if the tension members 5 are made of glass fiber reinforced plastic (GRP), the tension members 5 may be susceptible to damage when a strong force is applied locally on the tension members 5. However, with a configuration of fastening the tension members 5 through the intervening members as in one or more embodiments, the areas of pressing the tension members 5 can be enlarged, and a strong force is prevented to be applied locally on the tension members 5, thereby preventing damages to the tension members 5.

The metal sleeves 15 are tubular members in which the tension members 5 can be inserted. The metal sleeve 15 is configured to have a C-shaped cross section, and to be elastically deformable when a force is applied in the up-down direction. The metal sleeves 15 are inserted in advance in the holes for tension member 11B. When the tension members 5 are inserted in the holes for tension member 11B, the tension members 5 are inserted in the tubular metal sleeves 15. The pair of anchoring screws 13 are arranged so as to clamp the metal sleeve 15 in the up-down direction.

When the anchoring screws 13 are tightened, the screw tips of the anchoring screws 13 press the metal sleeve 15, deforming the metal sleeve 15, and the internal wall of the metal sleeve 15 fastens the tension member 5, whereby the optical cable 1 is anchored to the clamp member 10 through the tension member 5. The internal wall of the tubular metal sleeve 15 has a curved surface (a cylindrical surface) that curves along the external surface of the tension member 5, and thus the contact area of the intervening member and the tension member 5 (an area of pressing the tension member 5) can be enlarged, which can realize an especially strong anchoring force.

In one or more embodiments, in a stage before tightening the anchoring screws 13, gaps are formed between the screw tips of the anchoring screws 13 and the metal sleeves 15 (refer to FIG. 8A). In addition, slight gaps are also formed between the metal sleeves 15 and the tension members 5 (so as to enable insertion of the tension members 5 into the metal sleeves 15). As such, when the worker tightens the anchoring screws 13, first, as a first stage, the screw tips of the anchoring screws 13 contact the metal sleeves 15 and the worker feels resistance against the tightening force. At this first stage (at a stage when the resistance is felt, a stage when the screw tips of the anchoring screws 13 contact the metal sleeves 15), the tension members 5 have not been pressed by the metal sleeves 15, and the tension members 5 have not been anchored. Then, at a second stage, the worker tightens the anchoring screws 13 further than the first stage and causes the metal sleeves 15 to elastically deform and press the tension members 5 (refer to FIG. 8B). In one or more embodiments, a stable anchoring force can be obtained by defining the tightening amount (the rotation amount) of the anchoring screws 13 to a certain amount (e.g., a half rotation) at the second stage after the first stage. In other words, a structure that allows to easily obtain a stable anchoring force is acquired by forming the gaps between the screw tips of the anchoring screws 13 and the metal sleeves 15, as well as, forming the gaps between the metal sleeves 15 and the tension members 5 in advance. Further, this structure prevents the anchoring screws 13 to be excessively tightened, and thus, the damages to the tension members 5 are prevented.

Holder 60

Figure 9A:
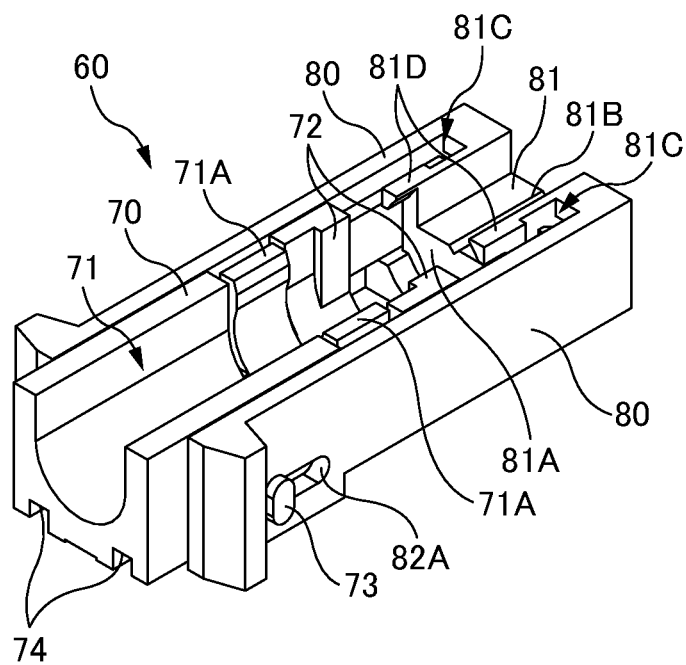
FIG. 9A is a perspective view of a holder 60.
Figure 9B:
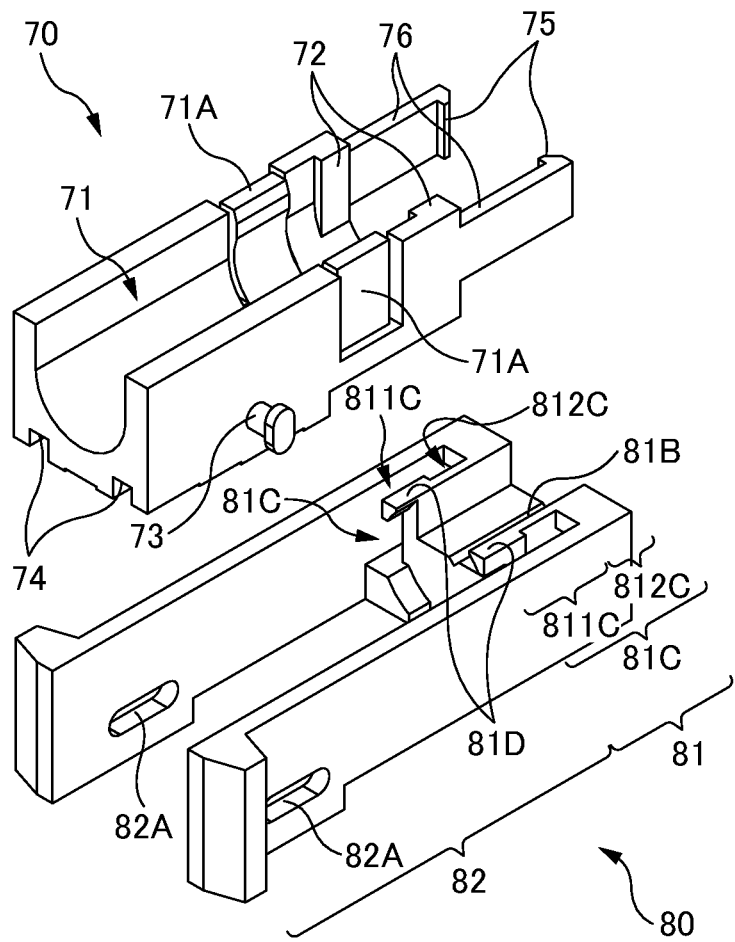
FIG. 9B is an exploded view of the holder 60.

FIG. 9A is a perspective view of the holder 60. FIG. 9B is an exploded view of the holder 60.

The holder 60 is a jig for holding the clamp member 10 fitted with the optical cable 1. The holder 60 is used, for example, as a jig for setting the clamp member 10 on a processing tool (for example, a stripper or a cutter) for preprocessing the end of the optical fiber 3. Further, the holder 60 is used as a jig for setting the clamp member 10 on the slider 90 (refer to FIG. 5A) upon insertion of the optical fiber 3 into the connector unit 20.

The holder 60 includes the holding member 70 and the spacer member 80. Note that the holding member 70 is movable along the front-rear direction with respect to the spacer member 80 (refer to FIGS. 4B and 4C) and is rotatable around a rotation shaft 73 as an axis (refer to FIG. 4D).

The holding member 70 is a member for holding the clamp member 10. The holding member 70 includes a housing part 71, the key protrusions 72, the rotation shaft 73, guide parts 74, and the claw parts 75.

The housing part 71 is a portion for housing the clamp member 10. The housing part 71 has a U-shaped cross section and includes a pair of side walls and a bottom wall that connects the pair of side walls. The housing part 71 includes a grip 71A formed thereon for gripping the clamp member 10. The internal wall of the grip 71A is formed to fit the outer peripheral surface of the clamp member 10 and allows slight elastic deformation thereof. When the grip 71A grips the clamp member 10, the clamp member 10 is prevented from coming off from the upper side of the holding member 70.

The key protrusions 72 are portions that protrude inward from the side walls of the housing part 71. The key protrusions 72 are configured to fit the key grooves 11F of the clamp member 10, and restrict the posture of the clamp member 10 when the clamp member 10 is housed in the holder 60 (specifically, the holding member 70).

The rotation shaft 73 is a portion around which the spacer member 80 rotates with respect to the holding member 70. The rotation shaft 73 is configured to protrude outward in the left-right direction from the side walls of the holding member 70 and is inserted through the long holes 82A of the spacer member 80. Note that the rotation shaft 73 also has a function of guiding the holding member 70 in the front-rear direction with respect to the spacer member 80 as the rotation shaft 73 is guided in the front-rear direction along the long holes 82A of the spacer member 80.

The guide parts 74 are portions of guiding the holder 60 in the front-rear direction along the slider 90. The guide parts 74 are formed in a groove shape along the front-rear direction on the bottom surface of the holding member 70.

The claw parts 75 are portions (engagement portions) that engage with the connector unit 20. When the claw parts 75 engage with the connector unit 20, the holding member 70 and the connector unit 20 are aligned in the front-rear direction, and thus, the clamp member 10 held by the holding member 70 and the connector unit 20 are aligned in the front-rear direction. Although the claw parts 75 are configured to hook the front flange 25A of the connector unit 20 (specifically, the connector unit housing 25) in one or more embodiments, the portion that the claw parts 75 hook is not limited to the front flange 25A. For example, grooves may be formed on the side surfaces of the connector unit 20 and the claw parts 75 may be configured to hook the grooves. When the claw parts 75 hook the connector unit 20 (specifically, the front flange 25A) as illustrated in FIG. 5B, the worker can be encouraged to insert a predetermined length of the optical fiber 3 into the connector unit 20 (specifically, the mechanical splice part 23), thereby ensuring the optical fiber 3 abutting on the endface of the internal fiber (not illustrated) of the connector unit 20. Further, when the claw parts 75 hook the connector unit 20, as illustrated in FIG. 5D, the endfaces of the optical fibers 3 can be kept abutted on each other.

The claw parts 75 are formed at the leading ends (front ends) of arm parts 76 that protrude forward from the front end of the housing part 71. The holding member 70 includes a pair of arm parts 76, and claw parts 75 that protrude inward are provided at the leading ends of the pair of arm parts 76. The pair of claw parts 75 or the pair of arm parts 76 are disposed to face each other in the left-right direction. Upon hooking the claw parts 75 on the connector unit 20, the rear part of the connector unit 20 (specifically, the connector unit housing 25) enters inside the space between the pair of arm parts 76. The arm parts 76 are portions that extend in the front-rear direction and have a function of guiding the holding member 70 in the front-rear direction with respect to the spacer member 80.

The spacer member 80 is a member for aligning the position of the clamp member 10 with respect to a processing tool (for example, a stripper or a cutter) that preprocesses the end of the optical fiber 3. The spacer member 80 includes a spacer part 81 and an outer frame part 82.

The spacer part 81 is a portion for maintaining a distance between a processing tool and the clamp member 10 at a predetermined length. The spacer part 81 includes an abutting surface 81A, a groove for fiber 81B, a claw accommodation parts 81C and restriction parts 81D.

The abutting surface 81A is a surface on which the front endface of the clamp member 10 abuts. As illustrated in FIG. 4C, when the holding member 70 is moved forward with respect to the spacer member 80 (or the spacer member 80 is moved backward with respect to the holding member 70) to cause the front endface of the clamp member 10 to abut on the abutting surface 81A of the spacer part 81, the position of the clamp member 10 with respect to the holder 60 is aligned. The interval between the abutting surface 81A and the front endface of the spacer member 80 is set to a predetermined length, which allows a stripper to remove a coating from a predetermined position of the optical fiber 3 extending from the front side of the clamp member 10, or allows a cutter to cut the optical fiber 3 extending from the front side of the clamp member 10 at a predetermined position.

The groove for fiber 81B is a groove-shaped portion provided in the upper surface of the spacer part 81. When the clamp member 10 is set in the holder 60, the optical fiber 3 extending from the front side of the clamp member 10 is arranged on the groove for fiber 81B (refer to FIGS. 4B and 4C).

The claw accommodation parts 81C are portions for housing the claw parts 75 of the holding member 70. The claw accommodation parts 81C are formed along the front-rear direction so as to allow the claw parts 75 (and the arm parts 76) to move in the front-rear direction. The bottom surface of each claw accommodation part 81C also functions as a guide surface for guiding the arm part 76 of the holding member 70 in the front-rear direction. Each claw accommodation part 81C includes a groove 811C and a hole 812C.

The groove 811C is a groove-shaped portion that is formed at the rear part of the claw accommodation part 81C. The groove 811C is a groove-shaped portion with the upper side open, which allows the claw part 75 to move in the up-down direction (specifically, a rotation movement around the rotation shaft 73). In a state illustrated in FIG. 4B, the claw parts 75 are positioned at the grooves 811C of the claw accommodation parts 81C, which allows the rotation movement of the spacer member 80 with respect to the holding member 70.

The hole 812C is a hole-shaped portion that is formed at the front part of the claw accommodation part 81C. The hole 812C is a hole-shaped portion with the upper side closed, which restricts the claw part 75 from moving upward. In a state illustrated in FIG. 4C, the claw parts 75 are inserted in the holes 812C of the claw accommodation parts 81C, and thus, the holes 812C restrict the upward movement of the claw part 75. Accordingly, the rotation movement of the spacer member 80 with respect to the holding member 70 is restricted.

The restriction parts 81D are portions for preventing the clamp member 10 from falling off. The restriction parts 81D are portions that protrude backward from the upper part of the abutting surface 81A. When the front endface of the clamp member 10 abuts on the abutting surface 81A of the spacer member 80, the restriction parts 81D are arranged on the upper side of the front part of the clamp member 10, thereby preventing the clamp member 10 from coming off from the upper side. The protruding amount of the restriction parts 81D (the protruding amount from the abutting surface 81A) is set shorter than the length where the spacer member 80 can move in the front-rear direction with respect to the holding member 70. In other words, the protruding amount of the restriction parts 81D is set shorter than the movement amount of the holding member 70 or the spacer member 80 from when the clamp member 10 is mounted on the holding member 70 (refer to FIG. 4B) until when the front endface of the clamp member 10 abuts on the abutting surface 81A of the spacer member 80 (refer to FIG. 4C).

The outer frame part 82 is a frame-shaped member that covers the sides of the holding member 70. The outer frame part 82 is configured as a pair of side plates between which the holding member 70 is arranged. The surfaces of the side plates constituting the outer frame part 82 are parallel to the front-rear direction, which allows relative movement between the holding member 70 and the spacer member 80 in the front-rear direction and rotation movement of the holding member 70 around the rotation shaft 73. The outer frame part 82 includes long holes 82A. The long holes 82A are inserted with the rotation shaft 73 of the holding member 70. The long holes 82A are elongated holes in the front-rear direction, which allows the relative movement of the holding member 70 with respect to the spacer member 80 in the front-rear direction. Further, the long holes 82A also have a function of guiding the rotation shaft 73 of the holding member 70 along the front-rear direction.

Boot Unit 40

FIG. 10A is a cross-sectional view of the boot unit 40. FIG. 10B is an enlarged view of a dashed line region of FIG. 10A and is an explanatory view of the boot 44 in a state after fastening the fastening member 46.

As described above, the boot unit 40 includes the rear housing 42, the boot 44, and the fastening member 46. The boot 44 includes a cable insertion hole formed therein, through which the optical cable 1 is inserted. While the rear housing 42 and the fastening member 46 are made of relatively hard material (for example, plastic or metal), the boot 44 is made of a relatively flexible material (for example, rubber) for protection of the optical cable 1. The fastening member 46 is arranged to cover the rear part of the rear housing 42 and the front part of the boot 44 from outside.

The front part of the boot 44 includes a receiving part 44A formed thereon. The receiving part 44A is a portion of receiving a force from the fastening member 46. In this example, the receiving part 44A is formed as a tapered portion that has a gradient where the outer shape becomes larger as it goes forward. In this way, the receiving part 44A can receive a forward force and an inward force from the fastening member 46 (refer to arrows in FIG. 10B).

The fastening member 46 includes, at the rear side, a pressing part 46B formed thereon. The pressing part 46B is a portion that presses the receiving part 44A of the boot 44. In this example, the pressing part 46B includes an internal wall that has a gradient where the inner diameter becomes smaller as it goes backward. However, without limitation to this shape, the shape of the pressing part 46B may be any shape that can press the receiving part 44A of the boot 44 when the fastening member 46 is fastened to the rear housing 42 by screwing.

As illustrated in FIG. 10A, the receiving part 44A of the boot 44 is arranged between the rear housing 42 and the pressing part 46B of the fastening member 46. When the fastening member 46 is screwed to the rear housing 42, the pressing part 46B of the fastening member 46 moves toward the rear housing 42, and, as illustrated in FIG. 10B, the pressing part 46B of the fastening member 46 presses the receiving part 44A of the boot 44. In other words, when the fastening member 46 is screwed to the rear housing 42, the receiving part 44A of the boot 44 is caught between the rear housing 42 and the pressing part 46B of the fastening member 46 and the receiving part 44A of the boot 44 receives a force from the pressing part 46B. In one or more embodiments, the receiving part 44A of the boot 44 receives a forward force and an inward force (toward the lower side of FIG. 10B, that is, the side of the optical cable 1) from the pressing part 46B.

The rear endface of the rear housing 42 and the front endface of the boot 44 face each other. Intrusion of water through a gap between the rear endface of the rear housing 42 and the front endface of the boot 44 might cause damages to the optical connector 100. Thus, in one or more embodiments, when the fastening member 46 is screwed to the rear housing 42, the gap between the rear endface of the rear housing 42 and the front endface of the boot 44 is narrowed. In other words, in one or more embodiments, when the fastening member 46 is screwed to the rear housing 42, the rear endface of the rear housing 42 and the front endface of the boot 44 become tightly in contact with each other. Specifically, when the fastening member 46 is screwed to the rear housing 42, as illustrated in FIG. 10B, the pressing part 46B of the fastening member 46 presses the receiving part 44A of the boot 44 forward (on the side of the rear housing 42), and the front endface of the boot 44 is deformed toward the rear endface of the rear housing 42. As such, water intrusion through the gap between the rear endface of the rear housing 42 and the front endface of the boot 44 can be prevented.

Further, intrusion of water through a gap between the optical cable through hole of the boot 44 and the optical cable 1 may cause damages to the optical connector 100. Thus, in one or more embodiments, when the fastening member 46 is screwed to the rear housing 42, the gap between the optical cable through hole of the boot 44 and the optical cable 1 is narrowed. In other words, when the fastening member 46 is screwed to the rear housing 42, as illustrated in FIG. 10B, the pressing part 46B of the fastening member 46 presses the receiving part 44A of the boot 44 inward (on the side of the optical cable 1), and the internal wall of the optical cable through hole of the boot 44 is deformed toward the optical cable 1. As such, the internal wall of the optical cable through hole of the boot 44 and the external surface of the optical cable 1 become tightly in contact with each other, which can prevent intrusion of water though the gap between the optical cable through hole of the boot 44 and the optical cable 1.

Brief Summary

The above-described clamp member 10 is fixed to the end of the optical cable 1 that includes the optical fiber 3 and the tension members 5 (refer to FIG. 3B), as well as, fixed and housed in the outer housing 52 of the optical connector 100 (refer to FIG. 2), where the body part 11 of the clamp member 10 includes the fiber insertion hole 11A through which the optical fiber 3 is inserted and the holes for tension member 11B in which the tension members 5 are inserted. The clamp member 10 of one or more embodiments includes anchoring screws 13 for fixing the tension members 5 that are inserted in the holes for tension member 11B to the body part 11. As such, when the anchoring screws 13 are tightened, the tension members 5 and the clamp member 10 can be fixed without using adhesive.

Further, in one or more embodiments, the body part 11 of the clamp member 10 includes the screw holes 11C that can bury the anchoring screws 13. In this way, by tightening the anchoring screws 13 until the anchoring screws 13 are buried in the screw holes 11C, lack of tightening of the anchoring screws 13 can be prevented.

Further, the clamp member 10 of one or more embodiments includes the pair of anchoring screws 13 that clamp any of the tension members 5 in the up-down direction (a direction perpendicular to the longitudinal direction of the tension member 5). In this way, each tension member 5 can be clamped from both sides in the up-down direction, thereby realizing a strong anchoring force.

Further, in one or more embodiments, intervening members (in this example, metal sleeves 15) are arranged between the tension members 5 and the anchoring screws 13. When the anchoring screws 13 are tightened while the tension members 5 are inserted in the holes for tension member 11B, the screw tips of the anchoring screws 13 press the intervening members and the tension members 5 are fixed to the body part 11 by the anchoring screws 13 through the intervening members. This can realize a strong anchoring force since the areas of pressing the tension members 5 can be enlarged.

In addition, in one or more embodiments, tubular metal sleeves 15 are arranged as the intervening members in the holes for tension member 11B, and when the anchoring screws 13 are tightened while the tension members 5 are inserted in the metal sleeves 15, the screw tips of the anchoring screws 13 press the metal sleeves 15 to deform the metal sleeves 15, and the tension members 5 are fixed to the body part 11 by the anchoring screws 13 through the metal sleeves 15. This can realize an especially strong anchoring force, since the contact area of the internal wall of the tubular metal sleeve 15 and the external surface of the tension member 5 can be enlarged.

Further, in one or more embodiments, in a stage before fastening the anchoring screws 13, gaps are formed between the screw tips of the anchoring screws 13 and the intervening members (in this example, the metal sleeves 15) (refer to FIG. 8A). As such, when the worker tightens the anchoring screws 13 by maintaining the tightening amount (rotation amount) of the anchoring screws 13 at a certain amount from the stage where the worker felt a resistance against the tightening force (a stage where the screw tips of the anchoring screws 13 are in contact with the intervening members), a stable anchoring force can be obtained, as well as, damages to the tension members 5 can be prevented.

Further, in one or more embodiments, the body part 11 includes key grooves 11F that fit the key protrusions 72 of the holder 60 (refer to FIG. 4A). This can suppress positional displacement of the clamp member 10 with respect to the holder 60.

Further, in one or more embodiments, the body part 11 includes a rear flange 11E for fixing the clamp member 10 to the outer housing 52. In this way, by making the step portion that protrudes inward from the inner peripheral surface of the outer housing 52 be in contact with the rear flange 11E of the clamp member 10, the clamp member 10 can be fixed to the outer housing 52.

The above-described optical connector 100 is an optical connector that is attached to an end of the optical cable 1 and includes the rear housing 42 (the outer housing), the boot 44, and the fastening member 46 that is fastened to the rear housing 42 while covering at least part of the boot 44. In one or more embodiments, when the fastening member 46 is fastened to the rear housing 42, the boot 44 is deformed by being pressed by the fastening member 46, narrowing a gap between the rear housing 42 and the boot 44. This can suppress intrusion of water through a gap near the boot 44.

Further, in one or more embodiments, when the fastening member 46 is fastened to the rear housing 42, the boot 44 is deformed by being pressed by the fastening member 46, narrowing a gap between the boot 44 and the optical cable 1. This can suppress intrusion of water through a gap near the boot 44.

Further, in one or more embodiments, the boot 44 includes the receiving part 44A that is formed in a tapered shape. When the fastening member 46 is fastened to the rear housing 42, the receiving part 44A is pressed by the fastening member 46 toward the rear housing 42, narrowing a gap between the rear housing 42 and the boot 44, as well as, the receiving part 44A is pressed by the fastening member 46 toward the optical cable 1, narrowing a gap between the boot 44 and the optical cable 1. This can suppress intrusion of water through two gaps near the boot.

FIG. 11A is an explanatory view of a clamp member 10 of one or more embodiments. FIG. 11A is a transparent perspective view where a body part 11 is made transparent in a state where tension members 5 of an optical cable 1 are inserted in holes for tension member 11B of the clamp member 10 in the same way as FIG. 7C.

In the above-described embodiments, an intervening member (the metal sleeve 15) is provided for each tension member 5. However, in one or more embodiments, the tension members 5 may be fixed to the body part 11 by anchoring screws 13 through plate-shaped intervening members 16 that are arranged to bridge the two tension members 5.

In one or more embodiments, as illustrated in FIG. 11A, the front edges and the rear edges of the intervening members 16 protrude toward the tension members 5. As such, the tension members 5 can be clamped from both sides in the up-down direction at two positions in the front-rear direction of the tension members 5. However, the shape of the intervening members 16 is not limited to this.

FIG. 11B is an explanatory view of a clamp member 10 of one or more embodiments. In the same way as FIG. 11A, FIG. 11B is a transparent perspective view where a body part 11 is made transparent in a state where tension members 5 of an optical cable 1 are inserted in holes for tension member 11B of a clamp member 10.

In one or more embodiments, plate-shaped intervening members 16 have plane surfaces on the side of the tension members 5 (facing surfaces of a pair of intervening members). According to one or more embodiments, the areas of pressing the tension member 5 can be enlarged, thereby realizing a strong anchoring force. Further, according to one or more embodiments, a force locally applied to the tension members 5 can be suppressed, thereby preventing damages to the tension members 5.

FIG. 11C is an explanatory view of a clamp member 10 of one or more embodiments. FIG. 11C is a transparent perspective view where a body part 11 is made transparent in a state where tension members 5 of an optical cable 1 are inserted in holes for tension member 11B of a clamp member 10.

In the above-described embodiments, intervening members (for example, the metal sleeves 15 or the intervening members 16) are arranged between the tension members 5 and the anchoring screws 13, and the tension members 5 are fixed to the body part 11 by the anchoring screws 13 through the intervening members. Whereas, in one or more embodiments described below, the screw tips of the anchoring screws 13 directly press the tension members 5, whereby the tension members 5 are fixed to the body part 11. In this way, the clamp member 10 may not have intervening members. According to one or more embodiments, the size of the clamp member 10 can be reduced. Note that when the screw tips of the anchoring screws 13 are directly in contact with the tension members 5 as in one or more embodiments, the screw tips of the anchoring screws 13 are flat (flat point) to prevent damages to the tension member 5.

In the above-described embodiments, the clamp member 10 includes anchoring screws 13 for fixing the tension members 5 that are inserted into the holes for tension member 11B to the body part 11. As such, even though adhesive is not used, the tension members 5 and the clamp member 10 can be fixed by tightening the anchoring screws 13.

Further, the clamp member 10 of one or more embodiments includes the pair of anchoring screws 13 that clamp the tension members 5 in the up-down direction (a direction perpendicular to the longitudinal direction of the tension members 5). In this way, the tension members 5 can be clamped from both sides in the up-down direction, thereby realizing a strong anchoring force.

Figure 12A:
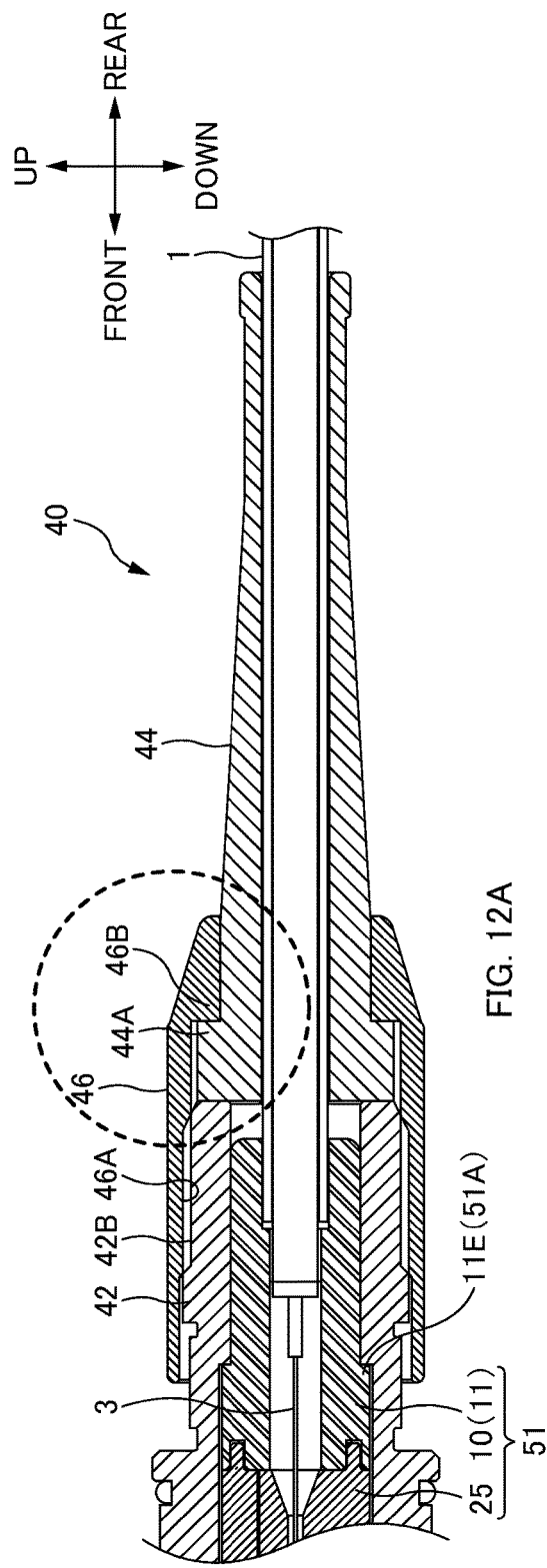
FIG. 12A is a cross-sectional view of a boot unit 40 of one or more embodiments.
Figure 12B:
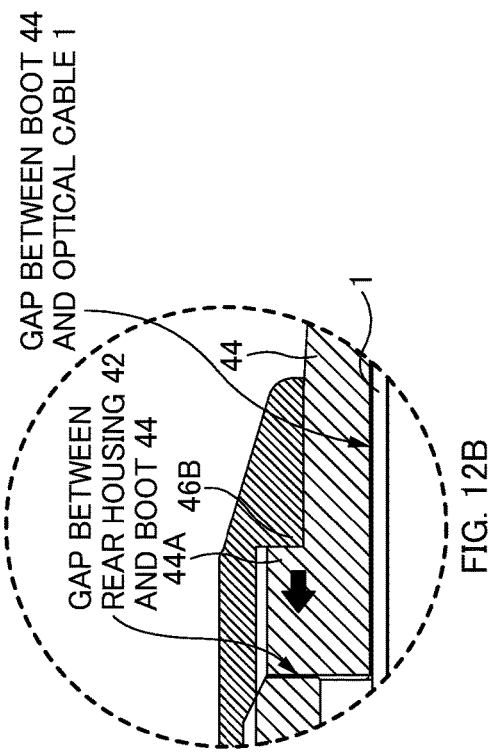
FIG. 12B is an enlarged view of a dashed line region of FIG. 12A and is an explanatory view of a state of the boot 44 after a fastening member 46 is fastened.

FIG. 12A is a cross-sectional view of a boot unit 40 of one or more embodiments. FIG. 12B is an enlarged view of a dashed line region of FIG. 12A and is an explanatory view of the boot 44 in a state after fastening a fastening member 46.

In the above-described embodiments, the receiving part 44A of the boot 44 is formed in a tapered shape where the outer shape becomes larger as is goes forward. Whereas, in one or more embodiments described below, a receiving part 44A of the boot 44 is formed in a flange shape that protrudes outward. In this way, the receiving part 44A can receive a forward force from the fastening member 46 (refer to an arrow in FIG. 10B).

Further, in the above-described embodiments, the pressing part 46B of the fastening member 46 includes an internal wall that has a gradient where the internal diameter becomes smaller as it goes backward. Whereas, in one or more embodiments described below, a pressing part 46B of the fastening member 46 includes a step surface that protrudes inward.

In one or more embodiments, as illustrated in FIG. 12A, the receiving part 44A of the boot 44 is arranged between a rear housing 42 and the pressing part 46B of the fastening member 46. When the fastening member 46 is screwed to the rear housing 42, the pressing part 46B of the fastening member 46 moves toward the rear housing 42, and, as illustrated in FIG. 12B, the pressing part 46B of the fastening member 46 presses the receiving part 44A of the boot 44. In other words, when the fastening member 46 is screwed to the rear housing 42, the receiving part 44A of the boot 44 is caught between the rear housing 42 and the pressing part 46B of the fastening member 46, and the receiving part 44A of the boot 44 receives a force from the pressing part 46B.

Similar to one or more embodiments described above, in one or more embodiments described below, the optical connector 100 is an optical connector that is attached to an end of an optical cable 1, and includes the rear housing 42

(a housing), the boot 44, and the fastening member 46 that is fastened to the rear housing 42 while covering at least part of the boot 44. In one or more embodiments, when the fastening member 46 is fastened to the rear housing 42, the boot 44 is deformed by being pressed by the fastening member 46, narrowing a gap between the rear housing 42 and the boot 44. This can suppress intrusion of water through a gap near the boot 44.

Note that, in one or more embodiments, a gap between the boot 44 and the optical cable 1 is hard to be narrowed even though the fastening member 46 is screwed to the rear housing 42. However, to prevent intrusion of water through the gap between the boot 44 and the optical cable 1, in one or more embodiments, the size of the cable insertion hole of the boot 44 is reduced compared with the outer shape of the optical cable 1 so that the optical cable 1 is inserted through the cable insertion hole as interference fit.

Note

The above embodiments are intended to facilitate understanding of the present invention, and are not intended to interpret the present invention with limitations. It will be appreciated that the present invention can be modified and/or improved without departing from the spirit thereof, as well as, the invention includes the equivalents.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A clamp member comprising:
    a body part that includes:
        a fiber insertion hole where an optical fiber is inserted, and
        a hole where a tension member is inserted; and
    an anchoring screw that fixes the tension member to the body part, wherein
    the clamp member is fixed to an end of an optical cable that includes the optical fiber and the tension member,
    the clamp member is fixed to and housed in an outer housing of an optical connector, and
    the fiber insertion hole is a through hole that extends from a rear side to a front side of the body part.

2. The clamp member according to claim 1, wherein the anchoring screw is buried in the body part.

3. The clamp member according to claim 1, further comprising:
    a pair of anchoring screws that clamp the tension member in a direction perpendicular to a longitudinal direction of the tension member.

4. The clamp member according to claim 1, wherein
    an intervening member is disposed between the tension member and the anchoring screw, and
    when the anchoring screw is tightened while the tension member is inserted in the hole, a screw tip of the anchoring screw presses the intervening member and fixes the tension member to the body part through the intervening member.

5. The clamp member according to claim 4, wherein
    the intervening member is a tubular sleeve disposed in the hole, and
    when the anchoring screw is tightened while the tension member is inserted in the tubular sleeve, the screw tip of the anchoring screw presses the tubular sleeve to deform the tubular sleeve and fixes the tension member to the body part through the tubular sleeve.

6. The clamp member according to claim 4, wherein
    when the anchoring screw is not tightened, a gap exists between the screw tip of the anchoring screw and the intervening member.

7. The clamp member according to claim 1, wherein
    when the anchoring screw is tightened while the tension member is inserted in the hole, a screw tip of the anchoring screw presses the tension member and fixes the tension member to the body part.

8. The clamp member according to claim 1, wherein
    the body part includes a key groove that fits a key protrusion of a holder that is used when processing the optical fiber.

9. The clamp member according to claim 1, wherein
    the body part includes a flange that fixes the clamp member to the outer housing.

10. An optical connector that is attached to an end of an optical cable including an optical fiber and a tension member, the optical connector comprising:
    an outer housing; and
    a clamp member that is:
        fixed to the tension member of the optical cable, and
        fixed to and housed in the outer housing, wherein
    the clamp member comprises:
        a body part that includes:
            a fiber insertion hole where the optical fiber is inserted, and
            a hole where the tension member is inserted; and
        an anchoring screw that fixes the tension member to the body part, wherein
        the fiber insertion hole is a through hole that extends from a rear side to a front side of the body part.

11. The optical connector according to claim 10, wherein
    the anchoring screw is buried in the body part when the anchoring screw is tightened, and
    when a screw head of the anchoring screw protrudes from the body part, the screw head contacts an internal wall of the outer housing and prevents the clamp member from being housed in the outer housing.

12. The optical connector according to claim 10, further comprising:
    a boot that protects the optical cable; and
    a fastening member that is fastened to the outer housing while covering at least part of the boot, wherein
    when fastened to the outer housing, the fastening member presses the boot and narrows a gap between the outer housing and the boot.

13. The optical connector according to claim 12, wherein
    the boot includes a receiving part with a tapered shape, and
    when the fastening member is fastened to the outer housing:
        the fastening member presses the receiving part toward the outer housing and narrows the gap between the outer housing and the boot, and
        the fastening member presses the receiving part toward the optical cable and narrows a gap between the boot and the optical cable.

14. The optical connector according to claim 12, wherein
    the boot includes a receiving part with a flange shape, and
    when fastened to the outer housing, the fastening member presses the receiving part toward the outer housing and narrows the gap between the outer housing and the boot.

15. The optical connector according to claim 10, further comprising:
a boot that includes:
a cable insertion hole where the optical cable is inserted; and
a fastening member that is fastened to the outer housing while covering at least part of the boot, wherein
when fastened to the outer housing, the fastening member presses the boot and narrows a gap between the boot and the optical cable.

16. The optical connector according to claim 15, wherein the boot includes a receiving part with a tapered shape, and
when the fastening member is fastened to the outer housing:
the fastening member presses the receiving part toward the optical cable and narrows the gap between the boot and the optical cable, and
the fastening member presses the receiving part toward the outer housing and narrows a gap between the outer housing and the boot.

17. A manufacturing method of an optical connector attached to an end of an optical cable that includes an optical fiber and a tension member, the manufacturing method of the optical connector comprising:
inserting the optical fiber through a fiber insertion hole of a clamp member and inserting the tension member in a hole of the clamp member;
tightening an anchoring screw of the clamp member and fixing the tension member to the clamp member; and
housing the clamp member in an outer housing while fixing the clamp member to the outer housing, wherein
the fiber insertion hole is a through hole that extends from a rear side to a front side of the body part.

* * * * *